United States Patent
Aoki et al.

(10) Patent No.: US 11,035,736 B2
(45) Date of Patent: Jun. 15, 2021

(54) IMAGE PROCESSING APPARATUS AND IMAGE PROCESSING METHOD

(71) Applicant: SONY CORPORATION, Tokyo (JP)

(72) Inventors: Suguru Aoki, Tokyo (JP); Atsushi Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 16/318,629

(22) PCT Filed: May 16, 2017

(86) PCT No.: PCT/JP2017/018378
§ 371 (c)(1),
(2) Date: Jan. 17, 2019

(87) PCT Pub. No.: WO2018/025466
PCT Pub. Date: Feb. 8, 2018

(65) Prior Publication Data
US 2019/0285479 A1     Sep. 19, 2019

(30) Foreign Application Priority Data

Aug. 4, 2016  (JP) .............................. JP2016-153471

(51) Int. Cl.
| | |
|---|---|
| *G01J 5/48* | (2006.01) |
| *G06K 15/02* | (2006.01) |
| *H04N 5/33* | (2006.01) |
| *G01V 8/10* | (2006.01) |
| *G06T 7/00* | (2017.01) |

(Continued)

(52) U.S. Cl.
CPC .............. *G01J 5/48* (2013.01); *G01V 8/10* (2013.01); *G06K 15/1878* (2013.01); *G06T 5/00* (2013.01); *G06T 7/00* (2013.01); *H04N 5/33* (2013.01); *H04N 7/18* (2013.01); *G01J 2005/0077* (2013.01)

(58) Field of Classification Search
CPC ... G06T 5/00; G06T 7/00; G06T 2207/10048; G06T 5/007; G06K 15/1878; G01J 5/48; G01J 2005/0077; G01V 8/10; H04N 7/18; H04N 5/33
See application file for complete search history.

(56) References Cited

U.S. PATENT DOCUMENTS

| | | |
|---|---|---|
| 5,877,688 A | 3/1999 | Morinaka et al. |
| 2008/0272999 A1 | 11/2008 | Kurokawa et al. |

(Continued)

FOREIGN PATENT DOCUMENTS

| | | |
|---|---|---|
| CA | 2955976 A1 | 1/2016 |
| CN | 102254521 A | 11/2011 |

(Continued)

OTHER PUBLICATIONS

International Search Report and Written Opinion of PCT Application No. PCT/JP2017/018378, dated Aug. 22, 2017, 10 pages of ISRWO.

(Continued)

*Primary Examiner* — Diane D Mizrahi
(74) *Attorney, Agent, or Firm* — Chip Law Group

(57) ABSTRACT

An image processing apparatus includes a conversion unit that applies grayscale conversion to a thermal image by using a conversion function based on data about a target object.

15 Claims, 20 Drawing Sheets

(51) Int. Cl.
*G06T 5/00* (2006.01)
*H04N 7/18* (2006.01)
*G01J 5/00* (2006.01)

(56) References Cited

U.S. PATENT DOCUMENTS

| | | |
|---|---|---|
| 2010/0045809 A1 | 2/2010 | Packard |
| 2013/0044146 A1 | 2/2013 | Kurokawa et al. |
| 2014/0267361 A1 | 9/2014 | Mcclanahan |
| 2015/0269742 A1 | 9/2015 | Bergstrom et al. |
| 2017/0236281 A1 | 8/2017 | Dacosta |
| 2018/0260958 A1 | 9/2018 | Bergstrom et al. |
| 2019/0320187 A1* | 10/2019 | Fuchie ............... H04N 19/14 |
| 2019/0325582 A1 | 10/2019 | Bergstrom et al. |
| 2019/0349581 A1* | 11/2019 | Fuchie ............ H04N 19/124 |
| 2020/0049455 A1* | 2/2020 | Hamilton ............ F41G 3/06 |
| 2020/0232762 A1* | 7/2020 | Hamilton ........... G02B 27/0101 |

FOREIGN PATENT DOCUMENTS

| | | |
|---|---|---|
| CN | 102693706 A | 9/2012 |
| CN | 104935808 A | 9/2015 |
| CN | 106714670 A | 5/2017 |
| DE | 69633524 T2 | 3/2005 |
| EP | 0737869 A2 | 10/1996 |
| EP | 2921995 A1 | 9/2015 |
| EP | 3171765 A1 | 5/2017 |
| JP | 08-320258 A | 12/1996 |
| JP | 11-219437 A | 8/1999 |
| JP | 2001-023095 A | 1/2001 |
| JP | 2003-296728 A | 10/2003 |
| JP | 2004-212349 A | 7/2004 |
| JP | 2011-039732 A | 2/2011 |
| JP | 2012-247225 A | 12/2012 |
| JP | 2017-524935 A | 8/2017 |
| KR | 10-2008-0095763 A | 10/2008 |
| TW | 200912870 A | 3/2009 |
| WO | 2014/200586 A2 | 12/2014 |
| WO | 2016/011534 A1 | 1/2016 |

OTHER PUBLICATIONS

Pan, et al., "Infrared Image Processing for a Physiological Information Telemetry System", Wireless Personal Communications, vol. 83, No. 4, Apr. 30, 2015, pp. 3181-3208.
Extended European Search Report of EP Application No. 17836573.0, dated Feb. 25, 2020, 09 pages.

* cited by examiner

FIG. 3
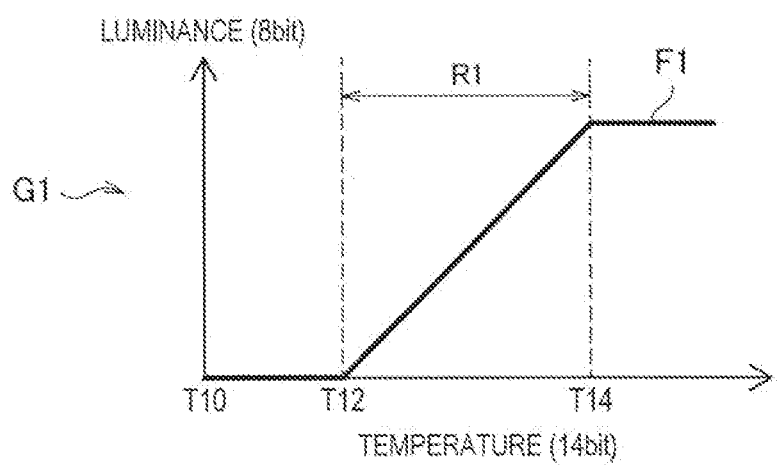
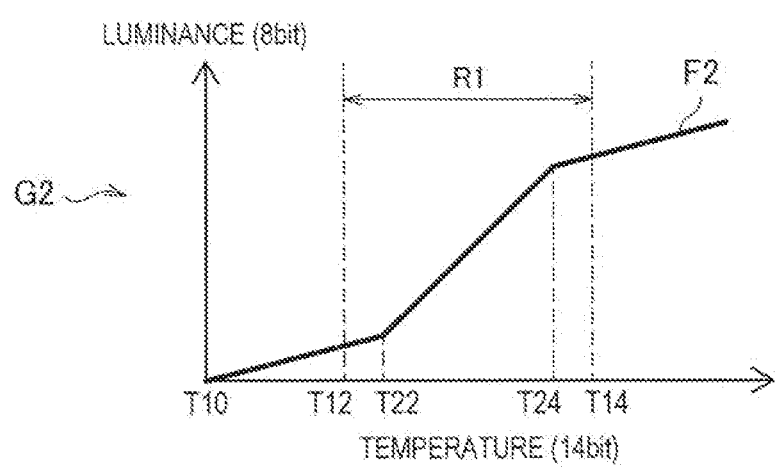

FIG. 4
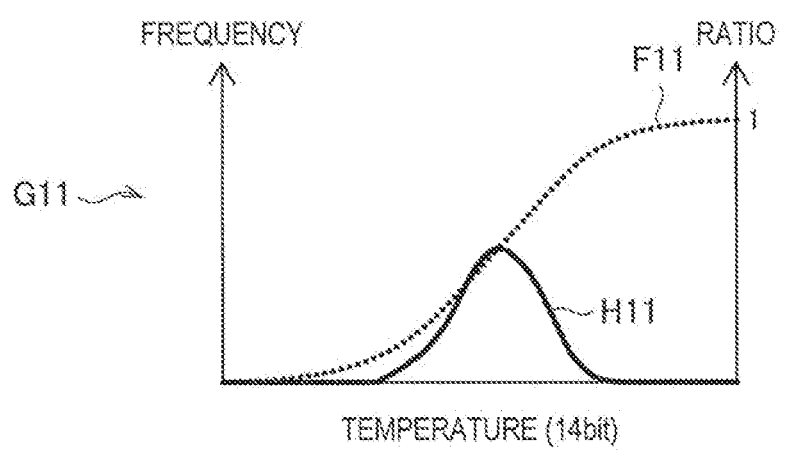
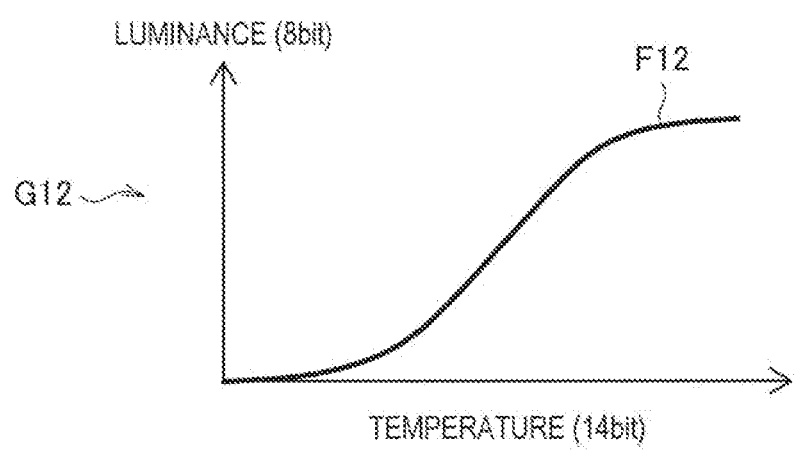

FIG. 5
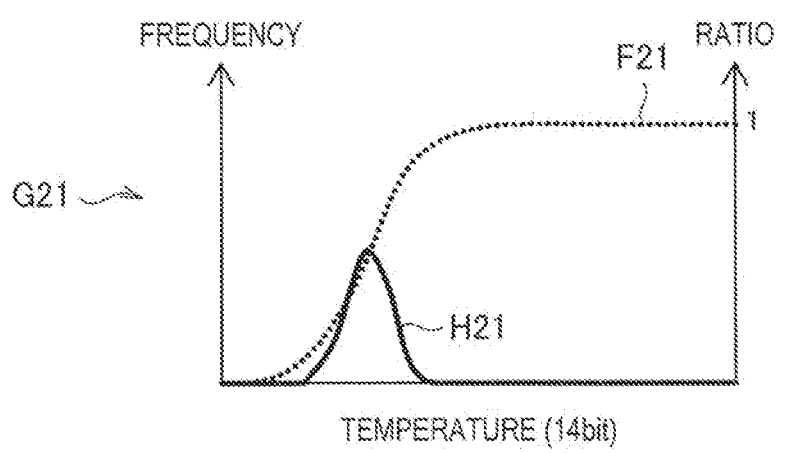
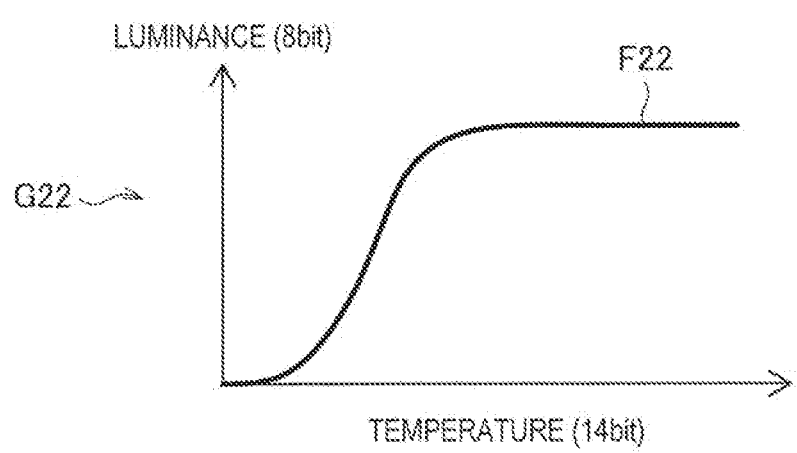

FIG. 6
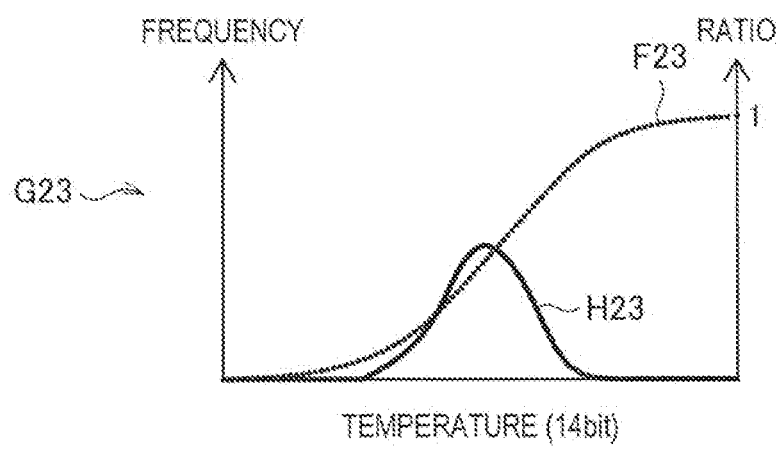
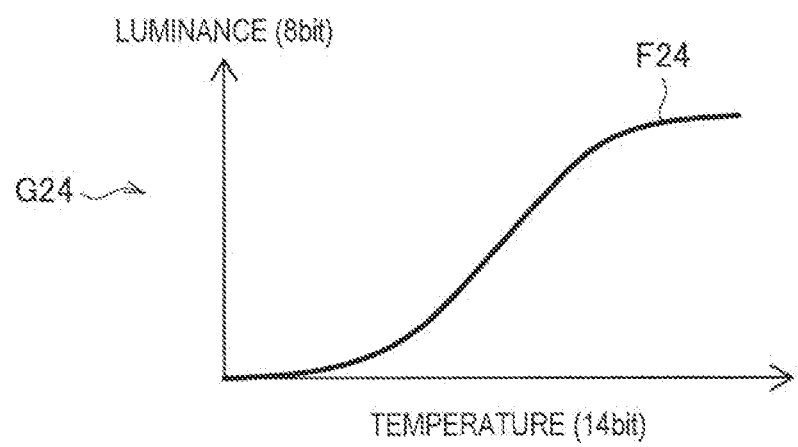

FIG. 8
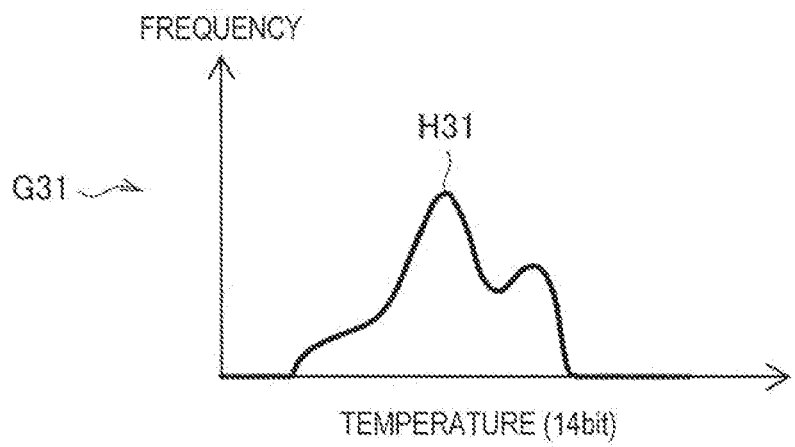
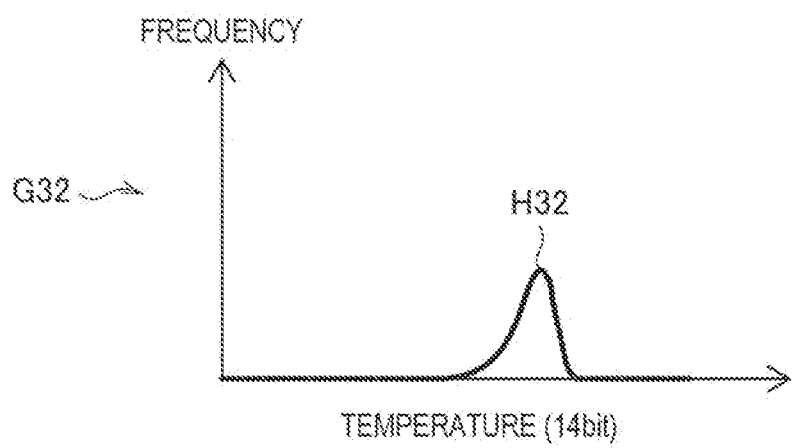
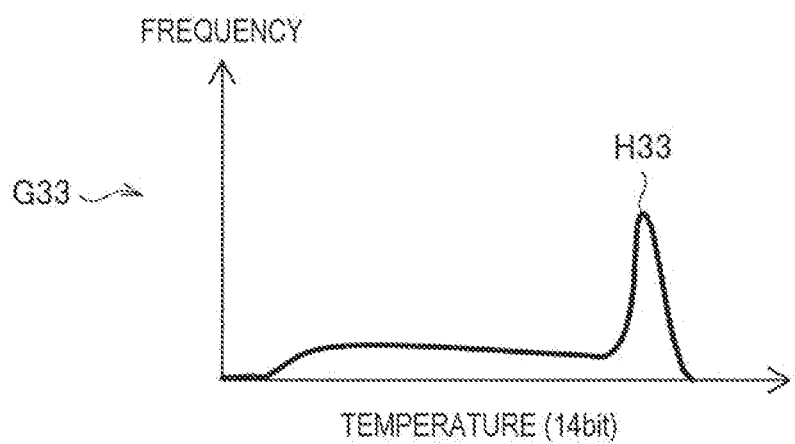

FIG. 12
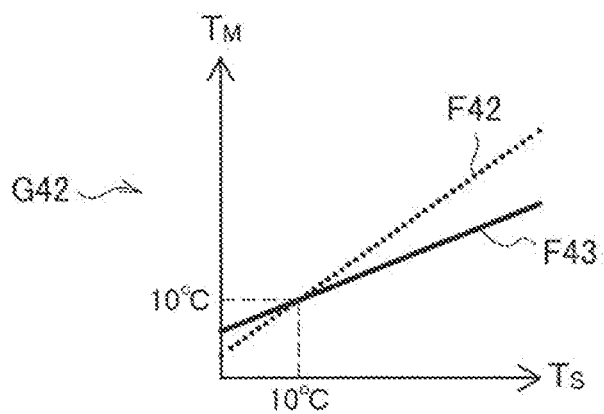
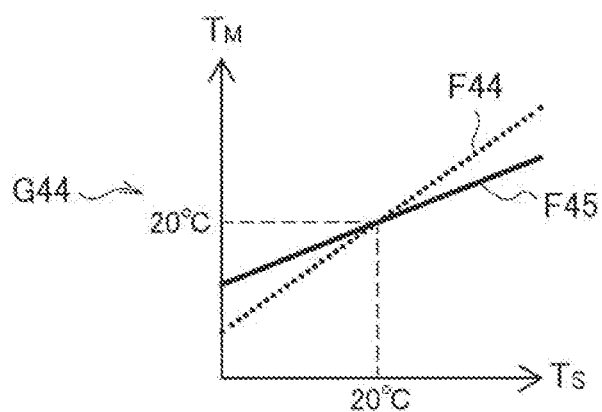
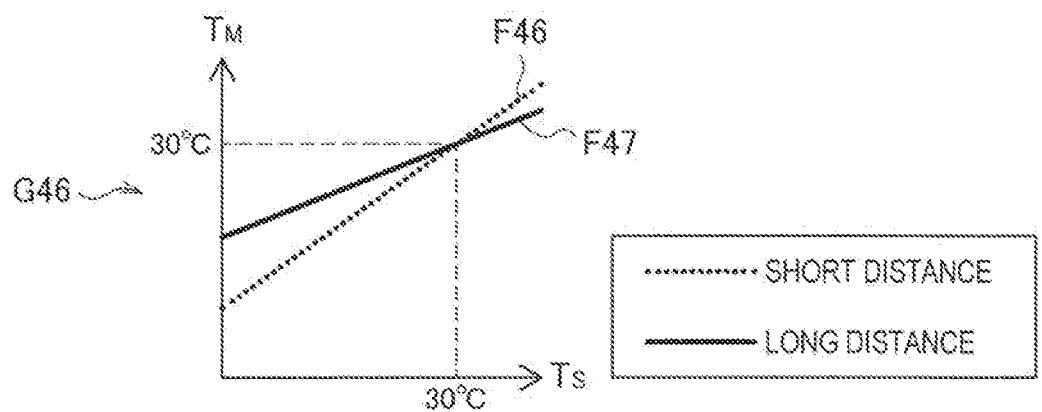

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/018378 filed on May 16, 2017, which claims priority benefit of Japanese Patent Application No. JP 2016-153471 filed in the Japan Patent Office on Aug. 4, 2016. Each of the above-referenced applications is hereby incorporated herein by reference in its entirety.

TECHNICAL FIELD

The present disclosure relates to an image processing apparatus and an image processing method.

BACKGROUND ART

Techniques of recognizing an object using a thermal image acquired by an infrared camera are recently developed. Even in a case where an object such as a human body is difficult to be detected from a visible light image, for example, at night or in bad weather, it is sometimes possible to detect an object from a thermal image.

The thermal image often has a larger number of bits than an image in the commonly used image processing, so grayscale conversion for converting the temperature (pixel value) of each pixel in the thermal image into a grayscale value (pixel value) having a smaller number of bits is performed to reduce throughput or amount of data. The object recognition is performed on an image obtained by applying the grayscale conversion, so the accuracy of object recognition is influenced by the grayscale conversion.

In one example, Patent Literature 1 discloses a technique of converting the output of an infrared sensor (a pixel value of a thermal image) into a grayscale value using a lookup table corresponding to ambient temperature and the distance and then performing detection processing to improve the detection accuracy of a target to be detected.

CITATION LIST

Patent Literature

Patent Literature 1: JP 2012-247225A

DISCLOSURE OF INVENTION

Technical Problem

The technique of performing object recognition such as object detection from the thermal image as described above is desirable to further improve the accuracy of recognition.

Solution to Problem

According to the present disclosure, there is provided an image processing apparatus including a conversion unit configured to apply grayscale conversion to a thermal image by using a conversion function based on data about a target object.

In addition, according to the present disclosure, there is provided an image processing method including applying, by a processor, grayscale conversion to a thermal image by using a conversion function based on data about a target object.

In addition, according to the present disclosure, there is provided an image processing apparatus including a conversion unit configured to estimate a photographic subject temperature pertaining to a photographic subject of a thermal image by using a conversion function specified on the basis of a distance among a plurality of conversion functions and applying grayscale conversion to the thermal image.

Advantageous Effects of Invention

According to the present disclosure as described above, the accuracy of recognition in object recognition using a thermal image is improved.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrated to describe an example of a conversion function according to the present embodiment.

FIG. 4 is a diagram illustrated to describe an example of a conversion function according to the present embodiment.

FIG. 5 is a diagram illustrated to describe an example of a conversion function according to the present embodiment.

FIG. 6 is a diagram illustrated to describe an example of a conversion function according to the present embodiment.

FIG. 8 is a diagram illustrated to describe an example of a conversion function according to the present embodiment.

FIG. 12 is a diagram illustrated to describe an example of a conversion function used to estimate a photographic subject temperature from an observed temperature.

MODE(S) FOR CARRYING OUT THE INVENTION

Figure 1:
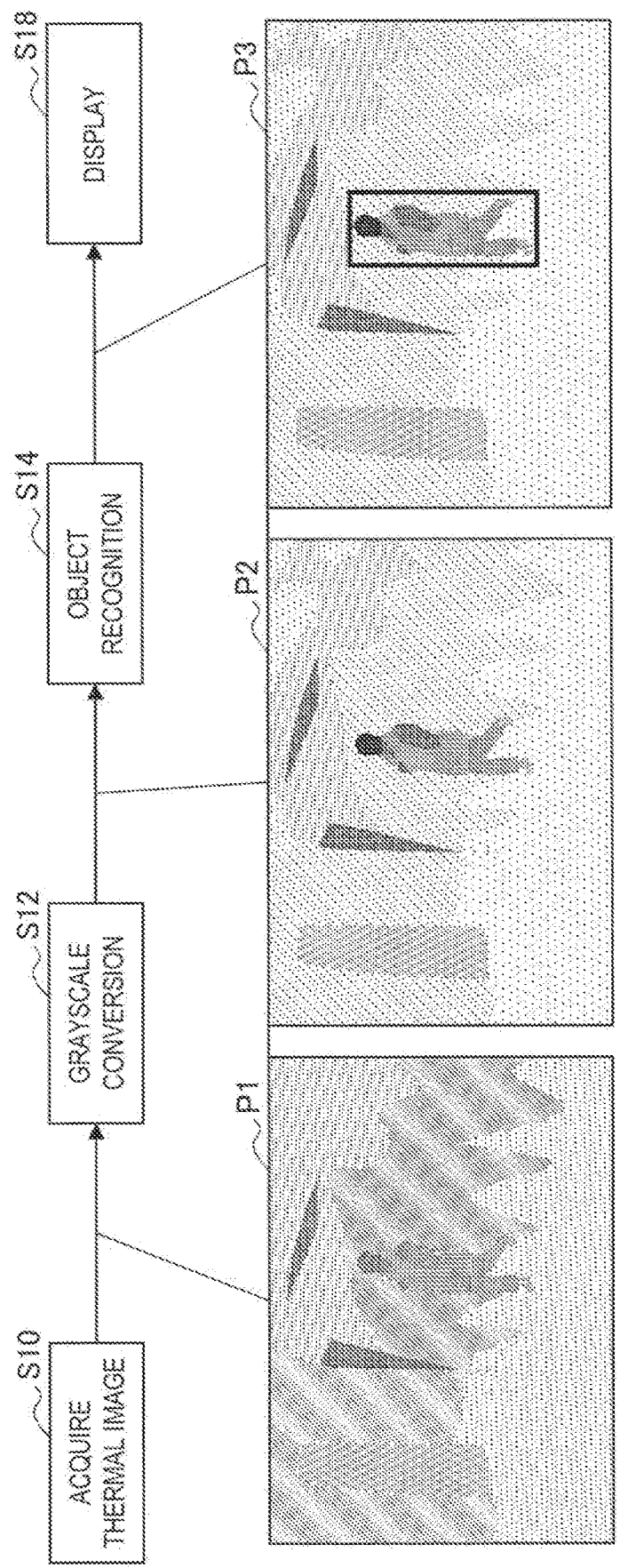
FIG. 1 is a diagram illustrated to describe an example of a scenario in which object recognition is performed from a thermal image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.
<<1. Overview>>
<<2. First embodiment>>
<2-1. Configuration>
<2-2. Operation>
<2-3. Advantageous effect>
<<3. Second embodiment>>
<3-1. Configuration>
<3-2. Operation>
<3-3. Advantageous effect>
<3-4. Modification>
<<4. Third embodiment>>
<4-1. Configuration>
<4-2. Operation>
<4-3. Advantageous effect>
<4-4. Modification>
<<5. Fourth embodiment>>
<5-1. Configuration>
<5-2. Operation>
<5-3. Advantageous effect>
<<6. Hardware configuration example>>
<<7. Concluding remarks>>

1. Overview

An overview of one embodiment of the present disclosure is now described with reference to FIG. 1. FIG. 1 is a diagram illustrated to describe an example of a scenario in which object recognition is performed from a thermal image. Referring to FIG. 1, a thermal image P1 is first acquired with an infrared camera (an example of a thermal image acquisition unit) that captures (senses) a thermal image (S10).

Moreover, the thermal image is generated, in one example, by capturing far-infrared rays emitted as blackbody radiation from an object by an image sensor of the infrared camera. The far-infrared rays are often defined as light rays having wavelengths of, in one example, 4 μm to 1000 μm, but there are various definitions of the boundary value of classification of infrared rays, and the advantages described below of the technology according to the present disclosure can be enjoyed under any definition.

Then, the thermal image P1 is applied with grayscale conversion (S12), and a converted image P2 is obtained. The image obtained by grayscale conversion is herein referred to as a converted image. In addition, herein, the grayscale conversion is transformation of each pixel value in an image using a conversion function, and includes cases where the number of bits of an image is different or identical before and after conversion. In addition, the conversion function herein is a rule indicating association between pixel values before and after conversion, and can include various forms such as look-up table or mathematical expression. In addition, in the following description, the pixel value in the converted image is referred to as luminance in some cases. Moreover, an example of the conversion function will be described later.

The object recognition is then performed on the converted image P2 (S14). FIG. 1 shows human body detection as an example of the object recognition. The object recognition according to the present disclosure is not limited to human body detection, but includes detection of various objects such as face and vehicle, identification of a person, identification of face orientation, or the like. Moreover, in the following description, an object to be a target in the object recognition, such as a human body in human body detection, a face in face detection, a vehicle in vehicle detection, a person in person identification, and a face in face orientation recognition, is referred to as a target object. A resultant image P3 of the object recognition is finally displayed on a display (S18).

Here, the accuracy of the object recognition in step S14 described above can vary depending on the grayscale conversion in step S12. In one example, in the case of performing object detection on an 8-bit converted image obtained by applying grayscale conversion to a 14-bit thermal image, if the 14-bit temperature range is simply compressed and assigned to 8-bit grayscale value, the grayscale in the region of the target object pertaining to the object detection will collapse (the grayscale values decrease). The accuracy of recognition is accordingly likely to be reduced. Thus, this disclosure provides a mechanism of grayscale conversion that further improves the accuracy of recognition.

Moreover, the series of processing steps described above can be executed on any type of device that captures a thermal image or processes the captured thermal image. Even if only a few examples are given, examples of the device that captures a thermal image include digital video camera, digital still camera, television broadcasting camera, surveillance camera, intercom with a monitor, in-vehicle camera, a smartphone, personal computer (PC), head-mounted display (HMD) terminal, game terminal, medical instrument, diagnostic equipment, inspection equipment, or the like. In addition, examples of the device that processes the thermal image can include television set, content player, content recorder, authoring device, or the like, in addition to various image capturing device described above. An image processing apparatus to be mentioned below can be a module mounted on or connected to the device exemplified here.

2. First Embodiment

Figure 2:
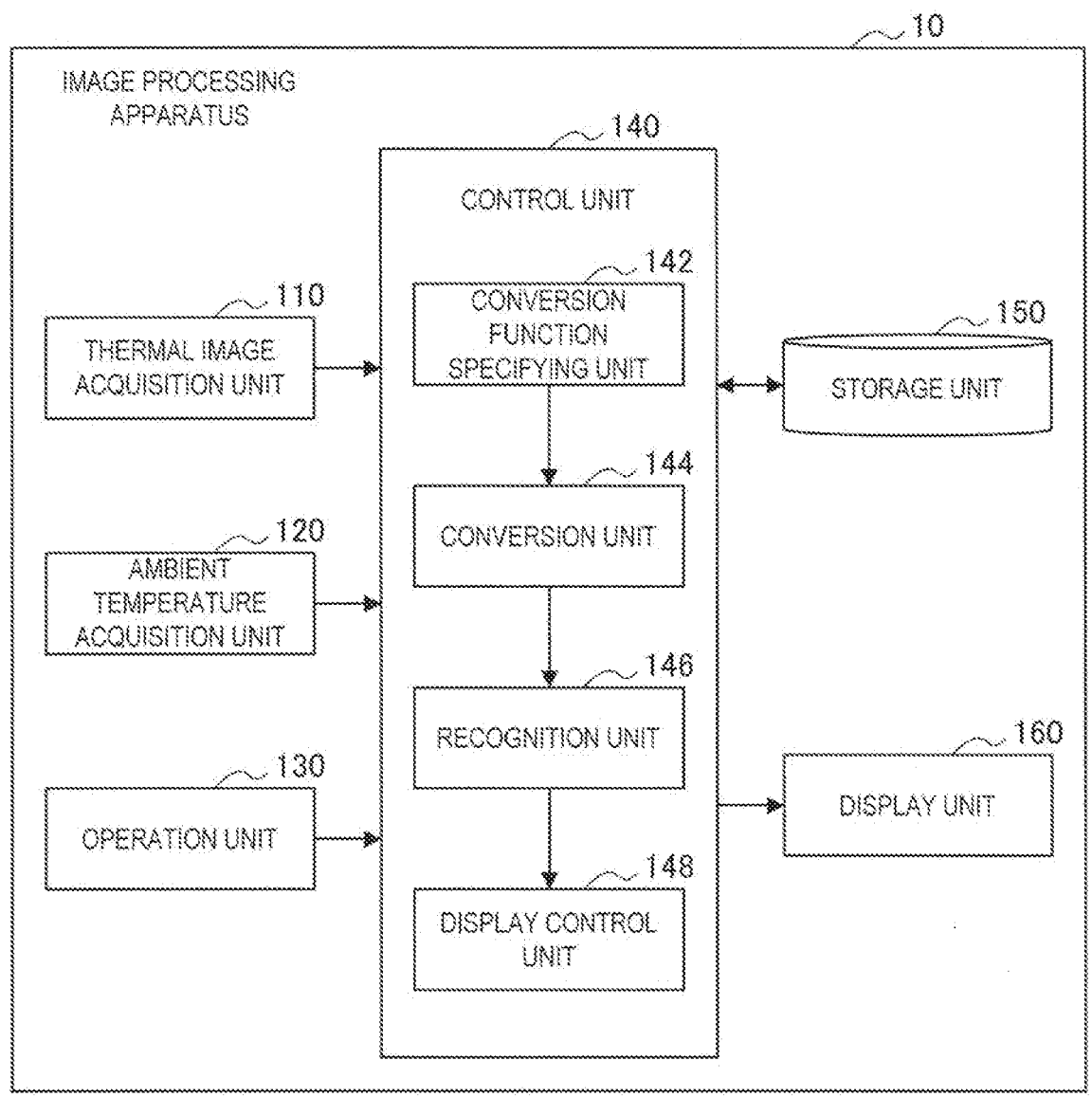
FIG. 2 is a block diagram illustrating a configuration example of an image processing apparatus according to a first embodiment of the present disclosure.

<2-1. Configuration>
FIG. 2 is a block diagram illustrating a configuration example of an image processing apparatus according to a first embodiment of the present disclosure. As illustrated in FIG. 2, an image processing apparatus 10 according to the present embodiment includes a thermal image acquisition unit 110, an ambient temperature acquisition unit 120, an operation unit 130, a control unit 140, a storage unit 150, and a display unit 160.

The thermal image acquisition unit 110 is a sensor that acquires a thermal image by sensing. In one example, the thermal image acquisition unit 110 can be an infrared camera (infrared sensor) having an image sensor for capturing far-infrared rays emitted as blackbody radiation from an object. In addition, the thermal image acquisition unit 110 can be other sensors capable of acquiring a thermal image by sensing. The thermal image acquired by the thermal image acquisition unit 110 is supplied to the control unit 140.

The ambient temperature acquisition unit 120 is a temperature sensor that acquires the ambient temperature around the image processing apparatus 10 by sensing. The ambient temperature acquired by the ambient temperature acquisition unit 120 is supplied to the control unit 140.

The operation unit 130 receives an input by the user and supplies it to the control unit 140. In one example, the user can perform an input for selecting one target object from a plurality of target objects by operating the operation unit 130, or can perform an input for selecting one conversion function among a plurality of conversion functions. Moreover, the operation unit 130 can be configured as, in one example, a mouse, a keyboard, a touch panel, buttons, a switch, a lever, a dial, or the like.

The control unit 140 controls each component of the image processing apparatus 10. In addition, the control unit 140 according to the present embodiment also functions as a conversion function specifying unit 142, a conversion unit 144, a recognition unit 146 (detection unit), and a display control unit 148, as illustrated in FIG. 2.

The conversion function specifying unit 142 specifies one conversion function among a plurality of conversion functions stored in the storage unit 150 to be described later, and supplies the specified conversion function to the conversion unit 144. In one example, the conversion function specifying unit 142 can specify one conversion function among a plurality of conversion functions depending on the ambient temperature supplied from the ambient temperature acquisition unit 120 and the user's input supplied from the operation unit 130. Such a configuration makes it possible to perform the grayscale conversion using an appropriate conversion function, thereby improving the accuracy of recognition in the object recognition from the thermal image.

The conversion function according to the present embodiment is a conversion function based on data about a target object, and is, in one example, previously produced by the image processing apparatus 10 or other devices and stored in the storage unit 150. In one example, the conversion function can be produced on the basis of the data about the target object in such a way to make the dynamic range in the target object region in a converted image larger. An example of the conversion function according to the present embodiment is described below with reference to FIGS. 3 to 8.

Moreover, the following description is given of an example of a conversion function used to convert a 14-bit thermal image into an 8-bit converted image, but the conversion function according to the present embodiment is not limited to such an example. In one example, the conversion function according to the present embodiment can be a conversion function in which the number of bits of an image is different before and after the conversion, or can be a conversion function in which the number of bits of an image is identical before and after the conversion.

FIG. 3 is a diagram illustrated to describe an example of a conversion function according to the present embodiment. In FIG. 3, graphs G1 and G2 are graphs showing conversion functions for performing predetermined conversion in a range corresponding to the temperature range of the target object (an example of data about the target object). Moreover, in the following description, temperature is a pixel value in the thermal image, and luminance is a pixel value in the converted image.

In FIG. 3, the graph G1 is a graph showing a conversion function F1 used to convert only a temperature range R1 (an example of a range corresponding to the temperature range) of a target object (e.g., a human body) obtained previously from 14-bit temperature into 8-bit luminance. In one example, the conversion function F1 is such a conversion function that luminance corresponding to temperature changes from 0 representing the minimum value to 255 representing the maximum value within the temperature range R1 (temperature T12 to temperature T14). In addition, in the conversion function F1, the luminance corresponding to temperature in the range from the temperature T10 to the temperature T12 is 0, and the luminance corresponding to the temperature equal to or higher than the temperature T14 is 255.

Such a configuration makes it easier to assign more bits to the target object region in the converted image, thereby improving the accuracy of object recognition.

Further, in FIG. 3, the graph G2 is a graph showing a conversion function F2 in which a range (an example of a range corresponding to the temperature range) where an offset is given to the temperature range R1 of the target object obtained previously is set to perform the conversion so that its slope is different between inside and outside of the range.

In one example, as illustrated in FIG. 3, the slope of the conversion function F2 is different between inside and outside of the range (temperature T22 to temperature T24) in which an offset is given to the temperature range R1, and the slope of the inside of the range is larger than that of the outside of the range.

Such a configuration makes it possible to improve the accuracy of object recognition, in one example, even in the case where the temperature of the target object includes a temperature deviated from the temperature range of the target object obtained previously.

Moreover, in FIG. 3, an example is illustrated in which the conversion function F1 and the conversion function F2 are linear in the range corresponding to the temperature range of the target object (the temperature range R1 and the range in which the offset is given to the temperature range R1). However, the conversion function according to the present embodiment is not limited to such an example. In one example, the conversion function according to the present embodiment can be non-linear in the range corresponding to the temperature range, and such a conversion function can be included in a conversion function performing a predetermined conversion within the range corresponding to the temperature range.

FIG. 4 is a diagram illustrated to describe another example of the conversion function according to the present embodiment. In FIG. 4, a graph G11 is a graph plotted between a temperature histogram H11 of a target object (e.g., a human body) obtained previously and a cumulative density function F11 of the temperature histogram H11. Moreover, in the following description, the axis corresponding to the temperature histogram represents a frequency, and the axis corresponding to the cumulative density function represents a ratio.

In FIG. 4, a graph G12 is a graph showing a conversion function F12 corresponding to the cumulative density function F11. In one example, the conversion function F12 illustrated in FIG. 4 is a conversion function produced in such a way that the minimum and maximum values in the cumulative density function F11 respectively correspond to the minimum and maximum values in the conversion function F12 (i.e., the minimum and maximum values in 8-bit luminance).

Such a configuration makes it easier to assign more bits to a temperature range having larger frequency in the temperature histogram of the target object, thereby improving the accuracy of object recognition.

Figure 7:
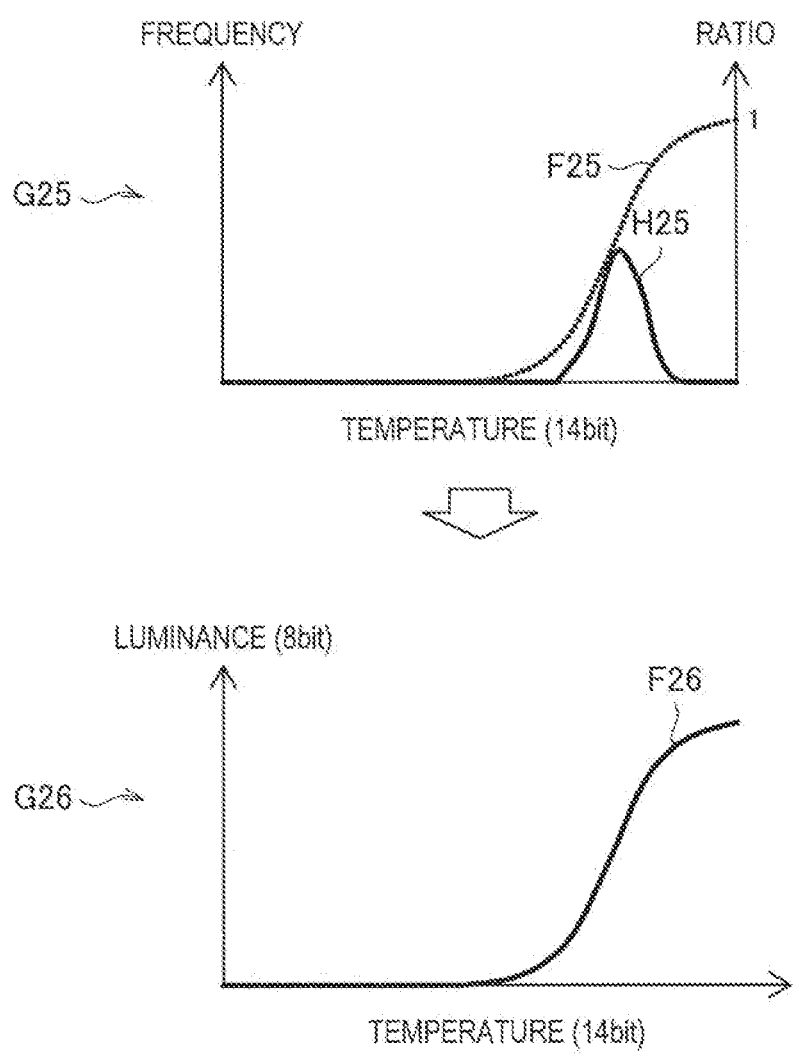
FIG. 7 is a diagram illustrated to describe an example of a conversion function according to the present embodiment.

FIGS. 5 to 9 are diagrams illustrated to describe another example of the conversion function according to the present embodiment. FIGS. 5 to 7 are graphs showing an example of a conversion function based on data about a target object (e.g., a human body) at different ambient temperatures.

In FIG. 5, a graph G21 is a graph plotted between a temperature histogram H21 of a target object obtained previously and a cumulative density function F21 of the temperature histogram H21 at a low ambient temperature. In addition, in FIG. 5, a graph G22 is a graph showing a conversion function F22 corresponding to the cumulative density function F21. The relationship between the cumulative density function F21 and the conversion function F22 is similar to the relationship between the cumulative density function F11 and the conversion function F12 described above, so description thereof will be omitted.

In FIG. 6, a graph G23 is a graph plotted between a temperature histogram H23 of a target object obtained previously and a cumulative density function F23 of the temperature histogram H23 at a normal (medium) ambient temperature. In addition, in FIG. 6, a graph G24 is a graph showing a conversion function F24 corresponding to the cumulative density function F23. The relationship between the cumulative density function F23 and the conversion function F24 is similar to the relationship between the cumulative density function F11 and the conversion function F12 described above, so description thereof will be omitted.

In FIG. 7, a graph G25 is a graph plotted between a temperature histogram H25 of a target object obtained previously and a cumulative density function F25 of the temperature histogram H25 at a high ambient temperature. In addition, in FIG. 7, a graph G26 is a graph showing a conversion function F26 corresponding to the cumulative density function F25. The relationship of the cumulative density function F25 and the conversion function F26 is similar to the relationship between the cumulative density function F11 and the conversion function F12 described above, so description thereof will be omitted.

In one example, the conversion function specifying unit 142 can specify a conversion function based on the temperature histogram of the target object at the closest ambient temperature among the conversion functions F22, F24, and F26 described above as the conversion function to be supplied to the conversion unit 144 depending on the ambient temperature.

Moreover, the above description is given of the conversion function based on the data about the target object at three ambient temperatures, but the present embodiment is not limited to such an example. In one example, a conversion function based on the data about the target object at two, four or more ambient temperatures is stored in the storage unit 150, and the conversion function specifying unit 142 can specify any one of these conversion functions depending on the ambient temperature.

FIG. 8 is a diagram illustrated to describe another example of the conversion function according to the present embodiment. In FIG. 8, graphs G31, G32, and G33 are graphs showing temperature histograms H31, H32, and H33 of a human body, a face, and a vehicle (an example of a target object), respectively. As described above with reference to FIGS. 4 to 7, the conversion function corresponding to the cumulative density function of the temperature histogram of the target object can be produced for each target object (human body, face, vehicle), and can be stored in the storage unit 150.

In one example, the conversion function specifying unit 142 can specify one conversion function among the conversion functions stored in the storage unit 150 as the conversion function to be supplied to the conversion unit 144 depending on a target object selected by the user's input through the operation unit 130.

Such a configuration makes it possible to specify a conversion function corresponding to the target object that the user desires to recognize among the plurality of types of target objects, thereby improving the accuracy of object recognition pertaining to the target object.

The above description is given of the example of the conversion function according to the present embodiment and the example in which the conversion function specifying unit 142 specifies the conversion function. Moreover, the conversion function and the specifying of the conversion function described above are merely examples, and the present embodiment is not limited to such examples. In one example, the conversion function specifying unit 142 can specify the conversion function depending on a combination of the ambient temperature and the target object selected by the user's input. In addition, the conversion function specifying unit 142 can specify one conversion function selected by user's input among the plurality of conversion functions stored in the storage unit 150 as the conversion function to be supplied to the conversion unit 144.

The conversion unit 144 applies the grayscale conversion to the thermal image using the conversion function specified by the conversion function specifying unit 142 and supplies the converted image obtained by the grayscale conversion to the recognition unit 146. The grayscale conversion by the conversion unit 144 can be the conversion in which the number of bits of an image is different before and after the conversion or the conversion in which the number of bits of an image is identical before and after the conversion, depending on the conversion function.

The recognition unit 146 performs the object recognition on the converted image generated by applying the grayscale conversion by the conversion unit 144. Although the object recognition performed by the recognition unit 146 is not particularly limited, in one example, the recognition unit 146 can have a function as a detection unit that detects an object (human body, face, vehicle, etc.) from the converted image. In addition, the recognition unit 146 can have a function of identifying a person detected from the converted image and a function of recognizing the orientation of the face detected from the converted image. Moreover, in a case where a target object is selected by the user's input through the operation unit 130, the recognition unit 146 performs the object recognition associated with the selected target object.

Further, the technique for object recognition performed by the recognition unit 146 is not particularly limited, and it can include a template matching technique using a template image prepared previously, a technique based on machine learning, or the like.

The display control unit 148 controls display on the display unit 160. In one example, the display control unit 148 causes the display unit 160 to display a result obtained from object recognition (recognition result) by the recognition unit 146. In a case where the recognition unit 146 detects a human body from the converted image, the display control unit 148 can cause an image in which a frame surrounding a region of the detected human body is superimposed on the converted image to be displayed as the recognition result (detection result).

The storage unit 150 has programs or parameters stored therein for allowing each component of the image processing apparatus 10 to function. In one example, the storage unit 150 can have a plurality of conversion functions stored therein.

The display unit 160 is a display that displays various screens under the control of the display control unit 148. In one example, the display unit 160 displays the result of object recognition performed by the recognition unit 146.

The above description is given of the configuration of the image processing apparatus 10 according to the present embodiment. Moreover, the configuration illustrated in FIG. 2 is an example, and the present embodiment is not limited thereto. In one example, each function of the control unit 140 and the function of the storage unit 150 according to the present embodiment can be on a cloud connected via a communication unit (not shown).

<2-2. Operation>

Figure 9:
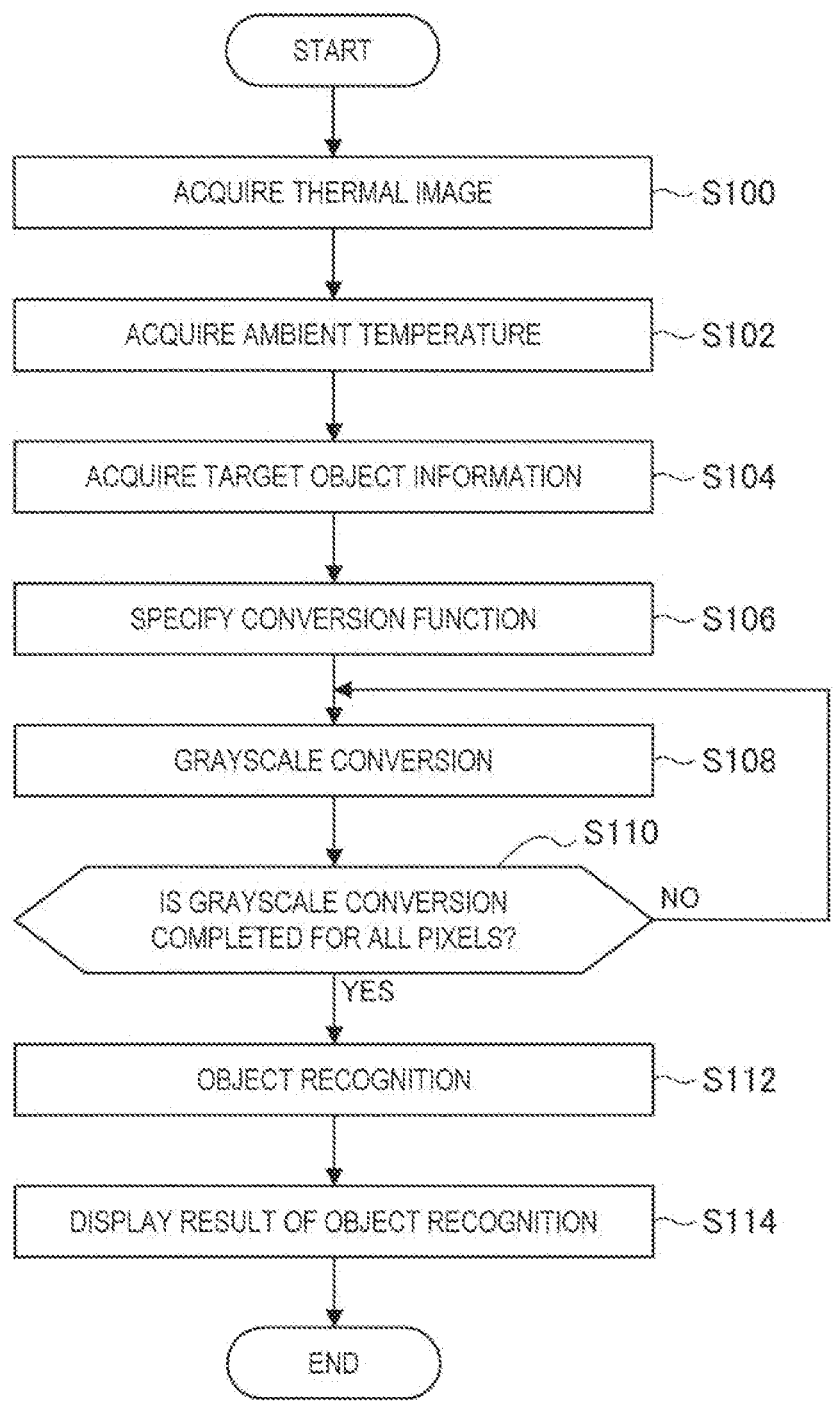
FIG. 9 is a flowchart illustrating an operation example of an image processing apparatus 10 according to the present embodiment.

The operation of the image processing apparatus 10 according to the present embodiment is now described with reference to FIG. 9. FIG. 9 is a flowchart illustrating an operation example of the image processing apparatus 10 according to the present embodiment.

As illustrated in FIG. 9, the thermal image acquisition unit 110 first acquires a thermal image by sensing (image capturing) (S100). Then, the ambient temperature acquisition unit 120 acquires the ambient temperature around the image processing apparatus 10 by sensing (S102). Then, information about a target object is selected (acquired) on the basis of the user's input through the operation unit 130 (S104).

The conversion function specifying unit 142 specifies one conversion function among the plurality of conversion functions stored in the storage unit 150 depending on the ambient temperature and the target object obtained in steps S102 and S104 (S106).

The conversion unit 144 then applies the grayscale conversion to the thermal image acquired in step S100 using the conversion function specified in step S106 (S108). Here, the conversion unit 144 refers to the conversion function, in one example, for each pixel of the thermal image and converts temperature into luminance. In the case where the grayscale conversion is not completed for all the pixels (NO in S110), the processing returns to step S108 and the grayscale conversion is continued.

In the case where the grayscale conversion is completed for all the pixels (YES in S110), the recognition unit 146 performs the object recognition on the converted image obtained by the grayscale conversion (S112). The display control unit 148 finally causes the display unit 160 to display the result of object recognition in step S112 (S114).

<2-3. Advantageous Effect>

According to the first embodiment of the present disclosure as described above, the grayscale conversion is applied using the conversion function produced on the basis of the data of the target object in such a way to make the dynamic range in a target object region larger, and the object recognition is performed on the converted image obtained by applying the grayscale conversion. Such a configuration improves the accuracy of object recognition.

3. Second Embodiment

The first embodiment of the present disclosure is described above. Then, a second embodiment of the present disclosure is described. In the second embodiment described below, it is possible to improve the accuracy of object recognition by correcting the influence of ambient temperature and estimating the photographic subject temperature pertaining to the photographic subject of the thermal image.

<3-1. Configuration>

Figure 10:
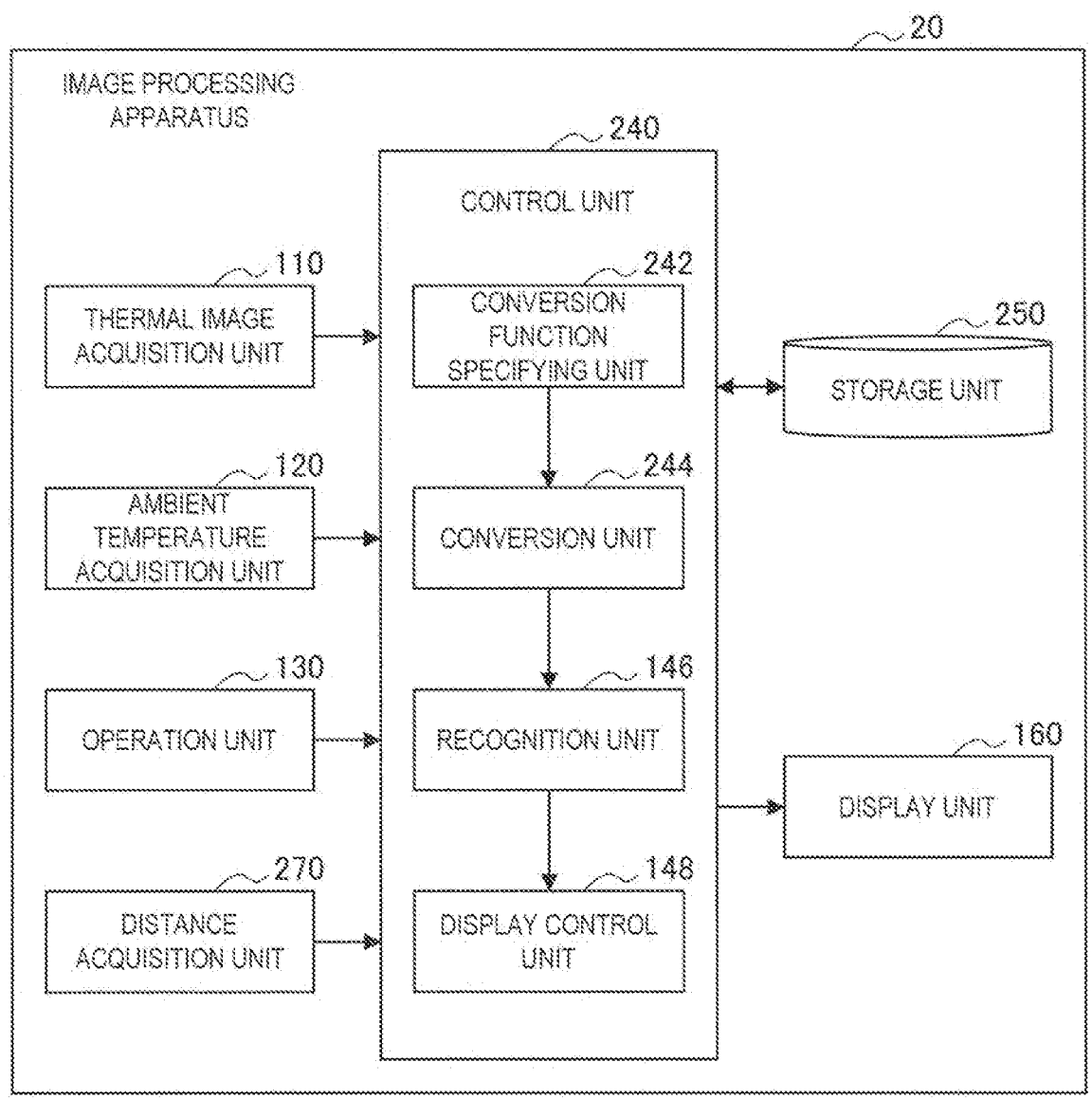
FIG. 10 is a diagram illustrated to describe a configuration example of an image processing apparatus according to a second embodiment of the present disclosure.

FIG. 10 is a diagram illustrated to describe a configuration example of an image processing apparatus according to a second embodiment of the present disclosure. As illustrated in FIG. 10, an image processing apparatus 20 according to the present embodiment differs from the image processing apparatus 10 in FIG. 2 in that a distance acquisition unit 270 is further included and functional configurations of a control unit 240 and a storage unit 250 differ from those of the control unit 140 and the storage unit 150, respectively, in FIG. 2. Moreover, the components substantially similar to the components illustrated in FIG. 2 among the respective components illustrated in FIG. 10 are denoted by the same reference numerals, so description thereof will be omitted.

The distance acquisition unit 270 acquires the distance from the thermal image acquisition unit 110 related to acquisition of the thermal image to a photographic subject by sensing. Although a technique for sensing the distance by the distance acquisition unit 270 is not particularly limited, the distance to the photographic subject is preferably acquired for each pixel of the thermal image. In one example, the distance acquisition unit 270 can be a depth sensor that acquires a range image corresponding to the thermal image. The distance to the photographic subject in each pixel of the thermal image acquired by the distance acquisition unit 270 is supplied to the control unit 240.

The control unit 240 illustrated in FIG. 10 controls each component of the image processing apparatus 20. In addition, the control unit 240 according to the present embodiment also functions as a conversion function specifying unit 242, a conversion unit 244, a recognition unit 146, and a display control unit 148, as illustrated in FIG. 10.

The conversion function specifying unit 242 according to the present embodiment specifies one conversion function among the plurality of conversion functions stored in the storage unit 250 and supplies the specified conversion function to the conversion unit 244, which is similar to the conversion function specifying unit 142 according to the first embodiment. In one example, the conversion function specifying unit 242 can specify a conversion function used to convert temperature into luminance depending on the ambient temperature supplied from the ambient temperature acquisition unit 120 and the user's input supplied from the operation unit 130.

Further, the conversion function specifying unit 242 according to the present embodiment further specifies a conversion function used to estimate temperature of the photographic subject depending on the ambient temperature supplied from the ambient temperature acquisition unit 120 and the distance acquired by the distance acquisition unit 270. The estimation of the photographic subject temperature from the thermal image is now described with reference to FIG. 11.

Figure 11:
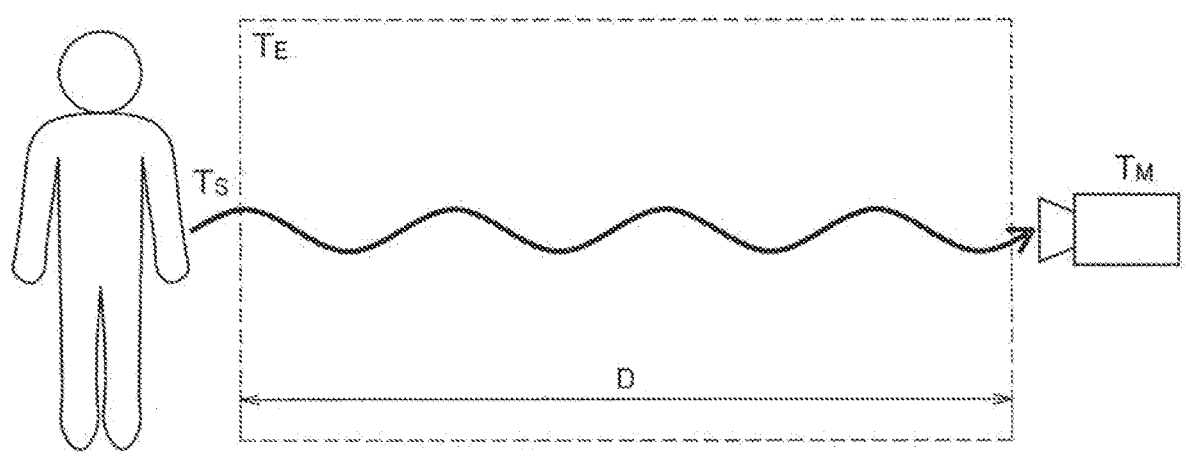
FIG. 11 is a diagram schematically illustrated to describe a relationship between distance, ambient temperature, photographic subject temperature, and observed temperature.

FIG. 11 is a diagram schematically illustrated to describe the relationship between a distance D, an ambient temperature $T_E$, a photographic subject temperature $T_S$, and an observed temperature $T_M$ (a pixel value in the thermal image). As illustrated in FIG. 11, the observed temperature $T_M$ is influenced not only by the photographic subject temperature $T_S$ but also by the ambient temperature $T_E$, and the magnitude of the influence depends on the distance D from the photographic subject to the thermal image acquisition unit.

Thus, it is possible to obtain the photographic subject temperature $T_S$ from the observed temperature $T_M$ by the grayscale conversion based on the ambient temperature $T_E$ and the distance D. Thus, a plurality of conversion functions (look-up tables) are produced by previously measuring the relationship between the distance D, the ambient temperature $T_E$, the photographic subject temperature $T_S$, and the observed temperature $T_M$, and are stored in the storage unit 250, and the conversion function specifying unit 242 specifies one conversion function among the plurality of conversion functions.

FIG. 12 is a diagram illustrated to describe an example of a conversion function used to estimate the photographic subject temperature $T_S$ from the observed temperature $T_M$. In FIG. 12, a graph G42 shows conversion functions F42 and F43 at an ambient temperature $T_E$=10° C., a graph G44 shows conversion functions F44 and F45 at an ambient temperature $T_E$=20° C., and a graph G46 shows conversion functions F46 and F47 at an ambient temperature $T_E$=30° C. Moreover, the conversion functions F42, F44, and F46 are conversion functions in a case where the distance D is small (short distance), and the conversion functions F43, F45, and F47 are conversion functions in a case where the distance D is large (long distance).

In the example illustrated in FIG. 12, the conversion function specifying unit 242 specifies a conversion function used to estimate the photographic subject temperature from the conversion functions F42 to F47 depending on the ambient temperatures supplied from the ambient temperature acquisition unit 120 and the distance acquired by the distance acquisition unit 270. Moreover, the conversion functions F42 to F47 are conversion functions, in one example, used to convert the 14-bit observed temperature $T_M$ into the 14-bit photographic subject temperature $T_S$.

Moreover, in FIG. 12, the example in which six conversion functions correspond to the combination of three ambient temperature values and two distance values is illustrated, but the present embodiment is not limited to such an example, and a larger number of conversion functions corresponding to more various combinations can be stored in the storage unit 250. The conversion function specifying unit 242 can specify a conversion function corresponding to the combination between the closest ambient temperature and the distance among the plurality of conversion functions stored in the storage unit 250, depending on the ambient temperature supplied from the ambient temperature acquisition unit 120 and the distance acquired by the distance acquisition unit 270.

The conversion unit 244 according to the present embodiment applies the grayscale conversion for converting temperature into luminance to the thermal image using the conversion function specified by the conversion function specifying unit 242 and supplies the obtained converted image to the recognition unit 146.

Further, the conversion unit 244 according to the present embodiment can estimate the photographic subject temperature pertaining to a photographic subject of the thermal image by further applying the grayscale conversion to the thermal image using the conversion function specified by the conversion function specifying unit 242 on the basis of the distance. Moreover, the thermal image having the estimated photographic subject temperature as the pixel value of each pixel can further be applied with grayscale conversion using another conversion function.

The storage unit 250 according to the present embodiment has programs and parameters stored therein that are used to cause each component of the image processing apparatus 10 to function, which is similar to the storage unit 150 according to the first embodiment. In one example, the storage unit 250 can have a plurality of conversion functions used to convert temperature into luminance, which is similar to the storage unit 150, and further can have a plurality of conversion functions stored therein that are used to estimate a photographic subject temperature from the observed temperature (conversion of observed temperature into photographic subject temperature).

<3-2. Operation>

Figure 13:
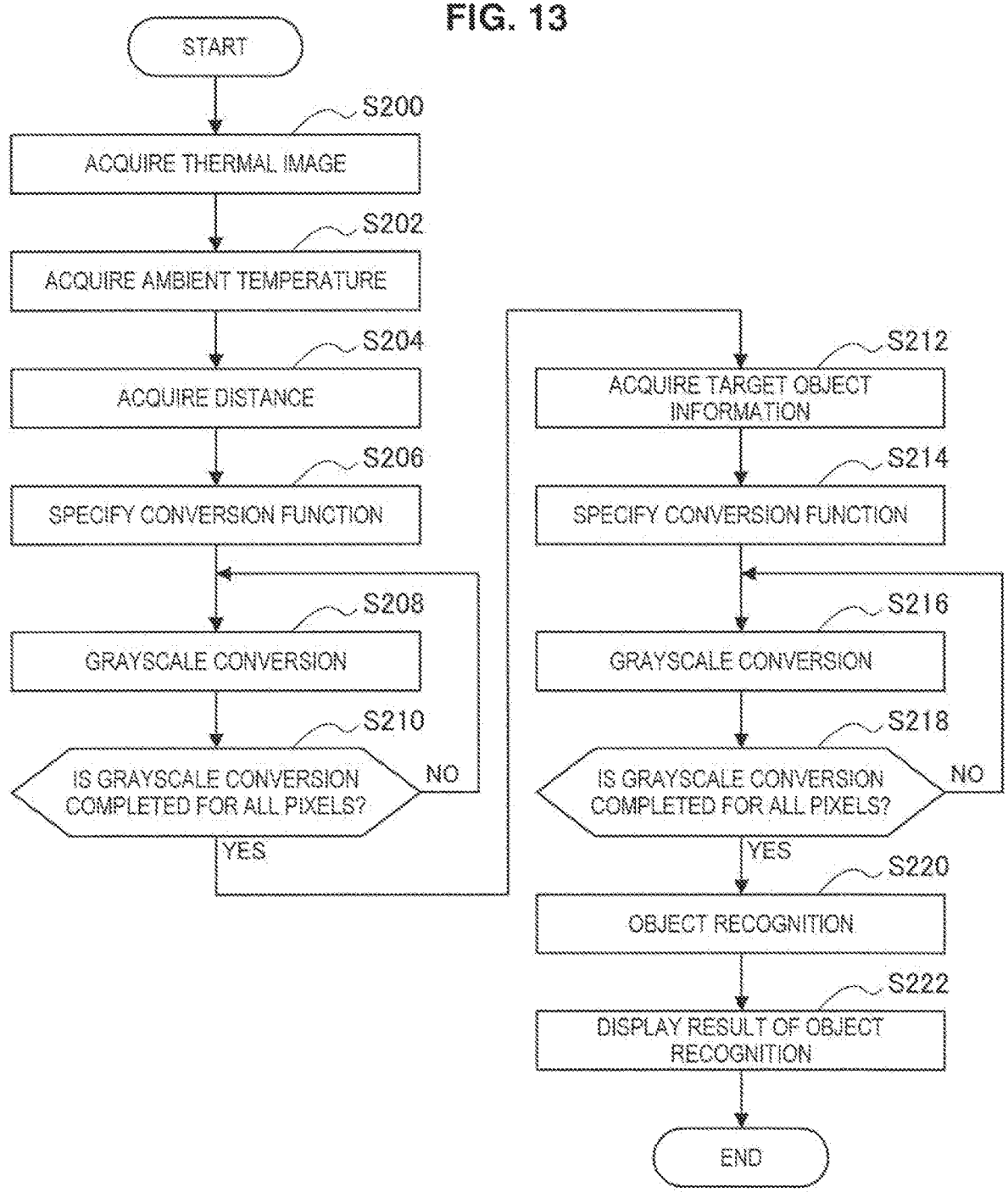
FIG. 13 is a flowchart illustrating an operation example of an image processing apparatus 20 according to the present embodiment.

The configuration of the image processing apparatus 20 according to the present embodiment is described above. Then, the operation of the image processing apparatus 20 according to the present embodiment is described with reference to FIG. 13. FIG. 13 is a flowchart illustrating an operation example of the image processing apparatus 20 according to the present embodiment.

As illustrated in FIG. 13, the thermal image acquisition unit 110 first acquires a thermal image by sensing (image capturing) (S200). Then, the ambient temperature acquisition unit 120 acquires the ambient temperature around the image processing apparatus 20 by sensing (S202). Then, the distance acquisition unit 270 acquires the distance from the thermal image acquisition unit 110 to the photographic subject by sensing (S204).

The conversion function specifying unit 242 specifies a conversion function used to estimate the photographic subject temperature depending on the ambient temperature and the distance acquired respectively in steps S202 and S204 (S206). Moreover, in step S206, the conversion function can be specified for each pixel of the thermal image.

Then, the conversion unit 244 applies the grayscale conversion to the thermal image acquired in step S200 using the conversion function specified in step S206 (step S208). Here, the conversion unit 244 converts the observed temperature into the photographic subject temperature with reference to the conversion function, in one example, for each pixel of the thermal image. In the case where the grayscale conversion is not completed for all the pixels (NO in S210), the processing returns to step S208 and the grayscale conversion is continued.

In the case where the grayscale conversion is completed for all the pixels (YES in S210), information about the target object is selected (acquired) on the basis of the user's input through the operation unit 130 (S212). The subsequent processing of steps S214 to S222 is similar to the processing of steps S106 to S114 described with reference to FIG. 9, except that each pixel value of the thermal image is the photographic subject temperature obtained in step S208, so description thereof will be omitted.

<3-3. Advantageous Effect>

According to the second embodiment of the present disclosure as described above, the photographic subject temperature pertaining to the photographic subject of the thermal image is estimated. In addition, the grayscale conversion is applied to a thermal image whose pixel value is the photographic subject temperature. Such a configuration makes it possible to improve the accuracy of object recognition.

<3-4. Modification>

Moreover, the above description is given of the example in which the image processing apparatus 20 illustrated in FIG. 10 includes the distance acquisition unit 270, but the present embodiment is not limited to such an example. In one example, the present embodiment is applicable, even if the image processing apparatus 20 does not include the distance acquisition unit 270 and fails to acquire the accurate distance from the thermal image acquisition unit 110 to the photographic subject. An example in which the conversion function specifying unit 242 specifies the conversion function in the case where the image processing apparatus 20 does not include the distance acquisition unit 270 is described below as a modification.

In one example, the conversion function specifying unit 242 can specify the conversion function depending on the distance at which the target object is to be detected by the recognition unit 146. The distance at which the target object is to be detected by the recognition unit 146 is described below.

In one example, a case where the recognition unit 146 scans the converted image while changing the size of a window pertaining to scanning and detects the target object by comparing a pixel value in the window with a pixel value of a template image prepared previously is considered. In such a case, it is assumed that the target object to be detected appears larger as the window size is larger, so the target object is considered to be closer to the thermal image acquisition unit 110. Thus, the larger the window size, the smaller the distance at which the target object is to be detected, and the smaller the window size, the larger the distance at which the target object is to be detected.

Further, a case where the recognition unit 146 scales down the converted image to generate image pyramids of a plurality of sizes and performs scanning with the same window size on the generated image pyramids of different sizes to detect the target object is considered. In such a case, the target object to be detected appears larger as the size of the image pyramid is smaller, so the target object is considered to be closer to the thermal image acquisition unit 110. Thus, the smaller the size of the image pyramid, the smaller the distance at which the target object is to be detected, and the larger the size of the image pyramid, the larger the distance at which the target object is to be detected.

As described above, even in the case where the image processing apparatus 20 does not include the distance acquisition unit 270, it is possible to specify the distance at which the target object is to be detected by the recognition unit 146, and the conversion function specifying unit 242 is capable of specifying the conversion function depending on the distance.

4. Third Embodiment

The first embodiment and the second embodiment of the present disclosure are described above. Then, a third embodiment of the present disclosure is described. An image processing apparatus according to the third embodiment of the present disclosure applies grayscale conversion to a region corresponding to a detected first target object in the thermal image and then performs the object recognition pertaining to a second target object, thus it is possible to improve the accuracy of object recognition pertaining to the second target object.

<4-1. Configuration>

Figure 14:
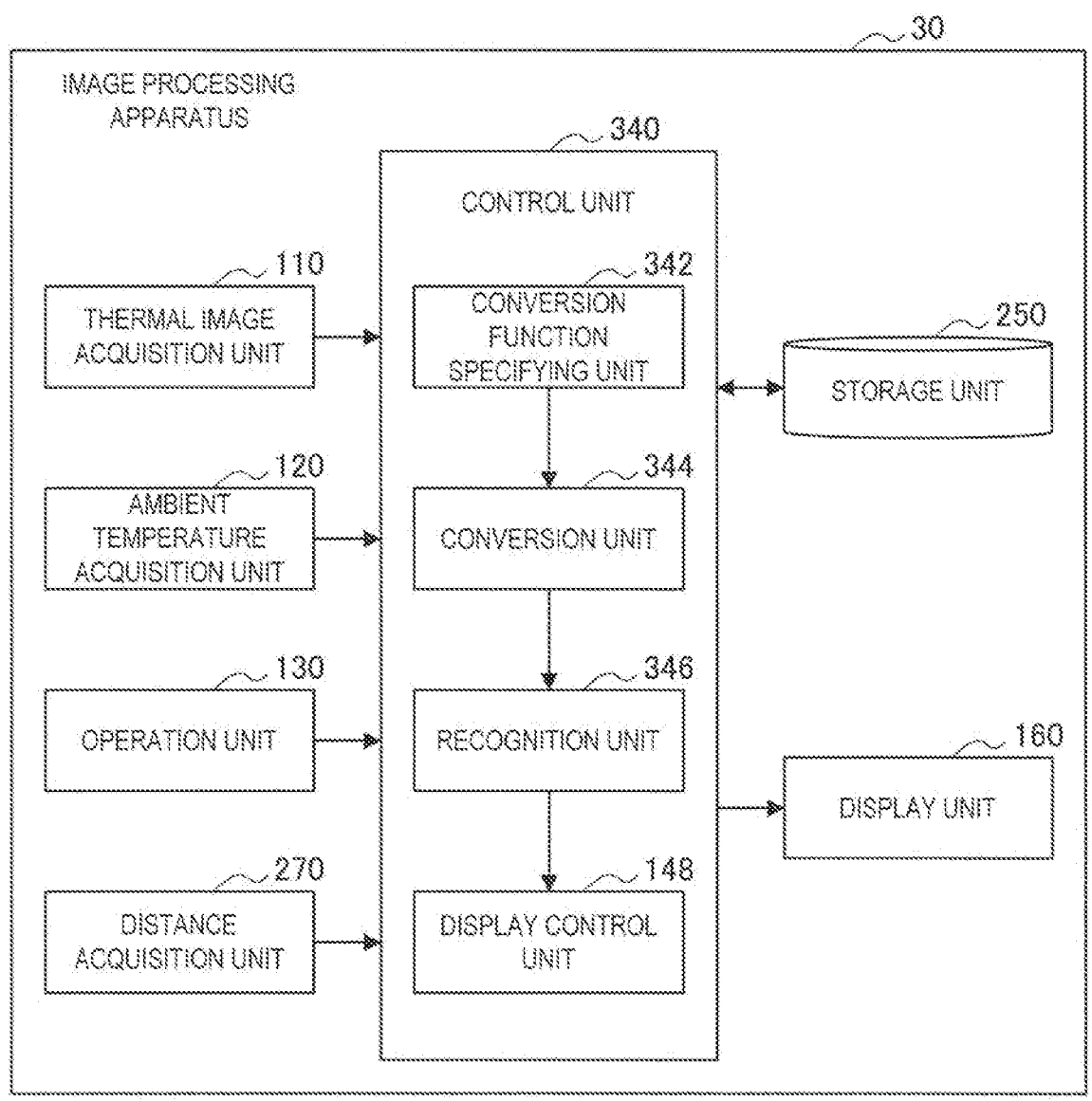
FIG. 14 is a diagram illustrated to describe a configuration example of an image processing apparatus according to a third embodiment of the present disclosure.

FIG. 14 is a diagram illustrated to describe a configuration example of the image processing apparatus according to the third embodiment of the present disclosure. As illustrated in FIG. 14, an image processing apparatus 30 according to the present embodiment differs from the image processing apparatus 20 illustrated in FIG. 10 in that the functional configuration of a control unit 340 is partially different from that of the control unit 240 illustrated in FIG. 10. Moreover, the components substantially similar to the components illustrated in FIG. 2 or 10 among the respective components illustrated in FIG. 14 are denoted by the same reference numerals, so description thereof will be omitted.

The control unit 340 illustrated in FIG. 14 controls each component of the image processing apparatus 30. In addition, the control unit 340 according to the present embodiment also functions as a conversion function specifying unit 342, a conversion unit 344, a recognition unit 346, and a display control unit 148, as illustrated in FIG. 14.

The conversion function specifying unit 342 according to the present embodiment specifies one conversion function among a plurality of conversion functions stored in the storage unit 250 and supplies the specified conversion function to the conversion unit 344, which is similar to the conversion function specifying unit 242 according to the second embodiment. In one example, the conversion function specifying unit 342 can specify a conversion function used to convert temperature into luminance depending on the ambient temperature supplied from the ambient temperature acquisition unit 120 and the user's input supplied from the operation unit 130. In addition, the conversion function specifying unit 342 can specify a conversion function used to estimate the photographic subject temperature depending on the ambient temperature supplied from the ambient temperature acquisition unit 120 and the distance acquired by the distance acquisition unit 270.

The conversion function specifying unit 342 according to the present embodiment differs from the conversion function specifying unit 142 according to the first embodiment and the conversion function specifying unit 242 according to the second embodiment in that at least two (two times) conversion functions used to convert temperature into luminance are specified. In one example, the conversion function specifying unit 342 can specify a first conversion function based on the data about the first target object and a second conversion function based on the data about the second target object. Examples of the first conversion function and the second conversion function specified by the conversion function specifying unit 342 according to the present embodiment will be described in detail later with reference to FIG. 15.

The conversion unit 344 according to the present embodiment estimates a photographic subject temperature pertaining to a photographic subject of a thermal image by applying grayscale conversion to a thermal image using a conversion function specified on the basis of the distance by the conversion function specifying unit 342, which is similar to the conversion unit 244 according to the second embodiment. Moreover, the thermal image in which the estimated photographic subject temperature is the pixel value of each pixel can be further applied with the grayscale conversion to be described below.

Further, the conversion unit 344 according to the present embodiment supplies the recognition unit 346 with a first converted image generated by applying the grayscale conversion for converting temperature into luminance to the thermal image using the first conversion function specified by the conversion function specifying unit 342. Furthermore, the conversion unit 344 according to the present embodiment generates a second converted image by applying the grayscale conversion to the region in the thermal image corresponding to the first target object detected by the recognition unit 346 (detection unit) using the second conversion function specified by the conversion function specifying unit 342. The generated second converted image is supplied to the recognition unit 346.

The recognition unit 346 according to the present embodiment performs the object recognition on the converted image that is generated by applying the grayscale conversion by the conversion unit 344, which is similar to the recognition unit 146 according to the first embodiment. The recognition unit 346 according to the present embodiment can function as a detection unit that detects the first target object from the first converted image supplied from the conversion unit 344. In addition, the recognition unit 346 according to the present embodiment can perform the object recognition pertaining to the second target object on the second converted image supplied from the conversion unit 344.

Figure 15:
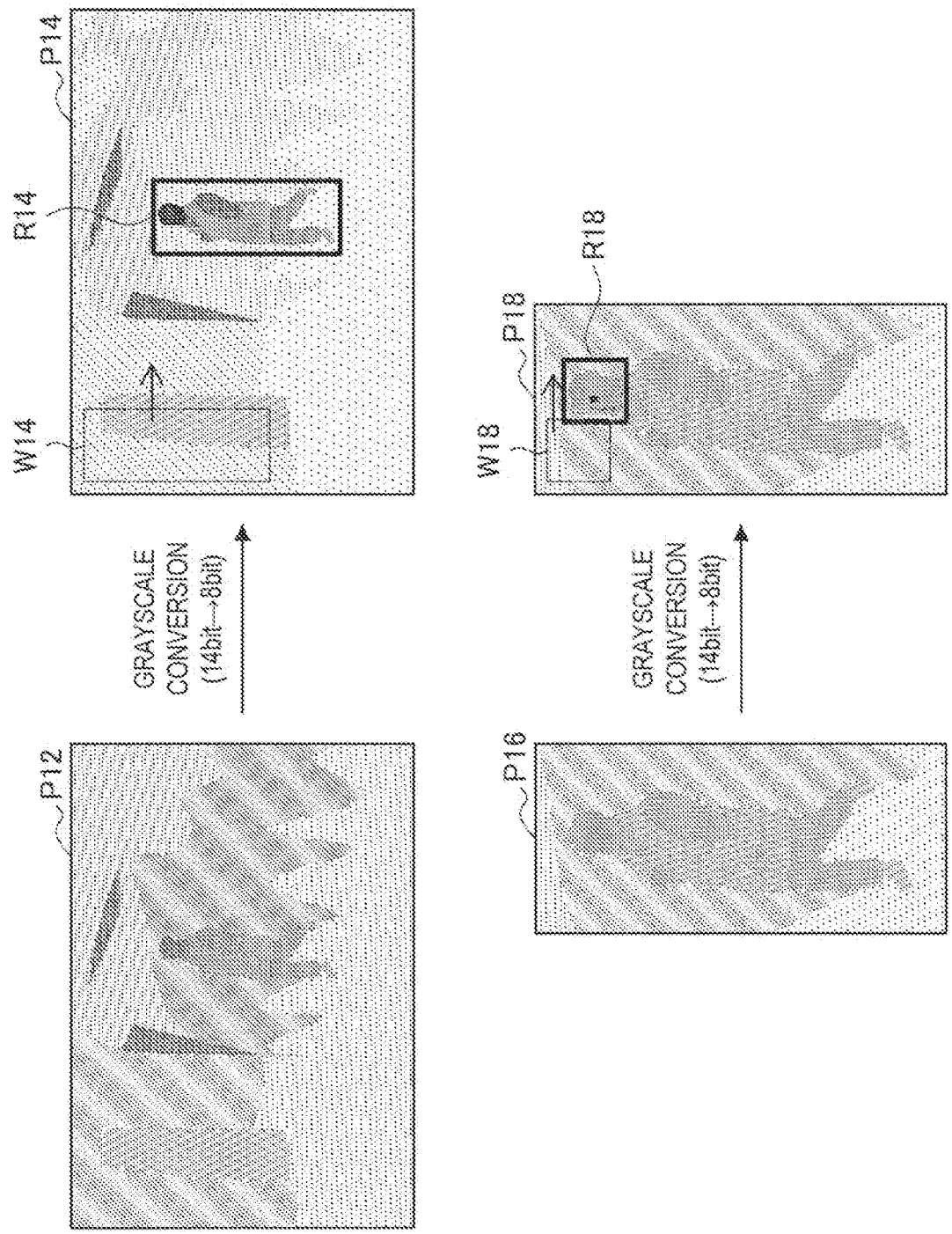
FIG. 15 is a schematic diagram illustrating a specific example of object recognition by a recognition unit 346 according to the present embodiment.

FIG. 15 is a schematic diagram illustrating a specific example of the object recognition performed by the recognition unit 346 according to the present embodiment. It is assumed below, in the example illustrated in FIG. 15, that the object recognition by the recognition unit 346 is intended to detect the face.

In FIG. 15, a thermal image P12 is a thermal image in which the conversion unit 344 uses the photographic subject temperature estimated by applying the grayscale conversion using the conversion function used to estimate the photographic subject temperature as the pixel value. Here, when face detection is performed on the converted image obtained by applying the grayscale conversion to the thermal image P12, erroneous detection can increase in some cases. Thus, the human body is detected, then the detected human body region is set as a candidate region including the face and the face detection is performed on the candidate region, thereby it is expected to improve the accuracy of face detection.

However, the grayscale conversion for generating a converted image used for human body detection is preferably performed using a conversion function different from that of the grayscale conversion for generating a converted image used for face detection. In one example, when the grayscale conversion using the conversion function based on data about the human body is performed, the grayscale of the facial region is collapsed and the luminance of the facial region is indistinctive, so the accuracy of face detection is likely to be lowered. Thus, as described below, in one example, the conversion unit 344 performs the grayscale conversion for human body detection and the grayscale conversion for face detection using two different conversion functions.

The conversion function specifying unit 342 first specifies the first conversion function based on data about the human body (the first target object). Then, the recognition unit 346 performs the human body detection from the first converted image that is generated by applying the grayscale conversion to the thermal image P12 by the conversion unit 344 using the first conversion function (an image P14 illustrated in FIG. 15). Here, as shown in the image P14, the recognition unit 346 performs scanning while shifting a window W14 to detect a human body region R14.

Further, the conversion function specifying unit 342 specifies the second conversion function based on data about the face (the second target object). The conversion unit 344 applies the grayscale conversion to a candidate region P16 corresponding to the first target object in the thermal image P12 that is detected by the recognition unit 346 using the second conversion function to generate the second converted image. Then, the recognition unit 346 performs the face detection from the generated second converted image (an image P18 illustrated in FIG. 15). Here, as shown in the image P18, the recognition unit 346 performs scanning while shifting a window W18 to detect a facial region R18.

Moreover, the human body and face described above are examples of the first target object and the second target object, respectively, and the present embodiment is not limited to such an example. The first target object and the second target can be various objects having, in one example, a relationship in which the second target object is included in the first target object.

<4-2. Operation>

Figure 16:
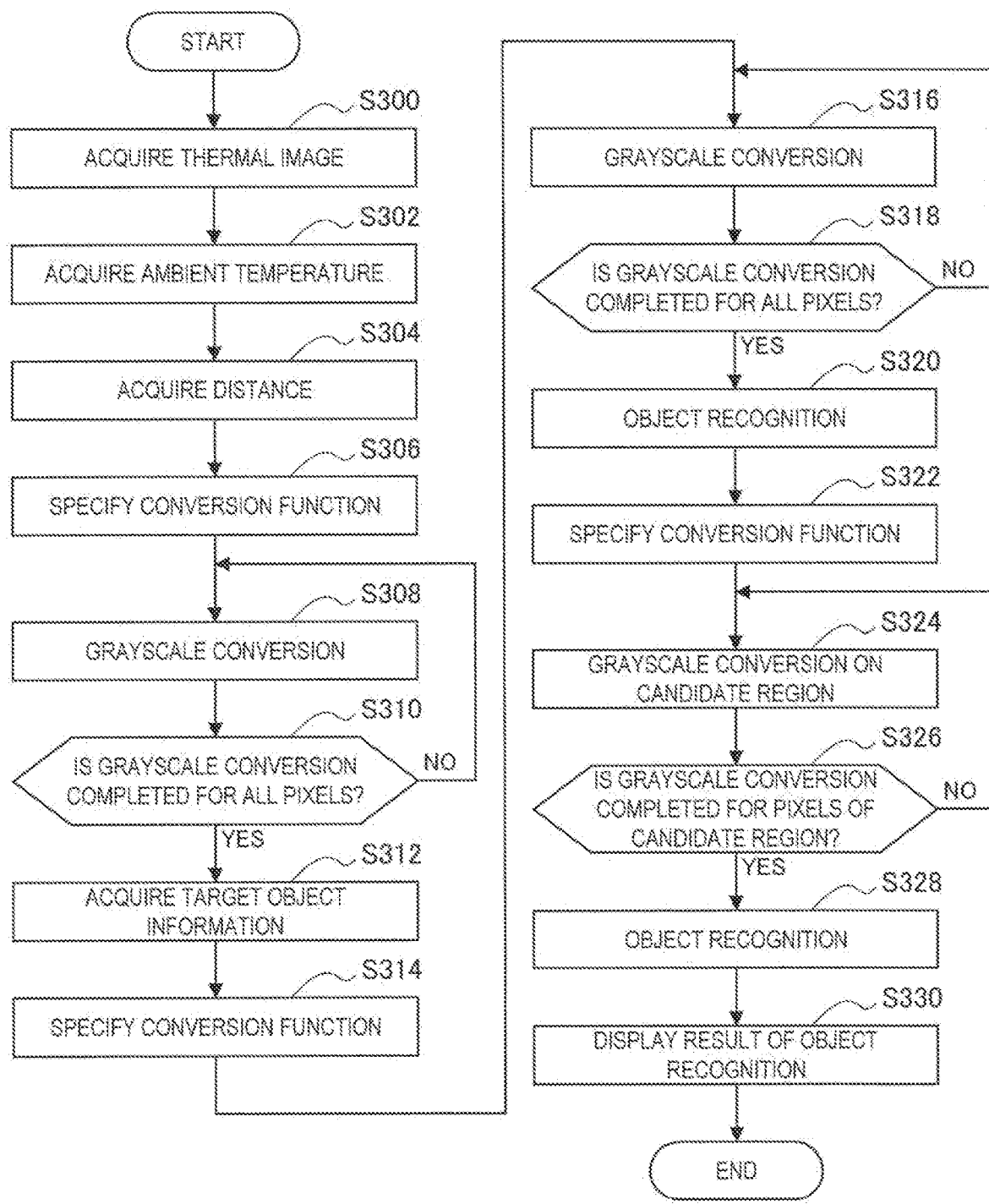
FIG. 16 is a flowchart illustrating an operation example of an image processing apparatus 30 according to the present embodiment.

The configuration of the image processing apparatus 30 according to the present embodiment is described above. Then, the operation of the image processing apparatus 30 according to the present embodiment is described with reference to FIG. 16. FIG. 16 is a flowchart illustrating an operation example of the image processing apparatus 30 according to the present embodiment.

The processing of steps S300 to S310 illustrated in FIG. 16 is similar to the processing of steps S200 to S210 described with reference to FIG. 13, so description thereof will be omitted.

Then, in step S312, information about the target object is selected (acquired) on the basis of the user's input through the operation unit 130. Moreover, here, the first target object and the second target object can be selected.

Then, the conversion function specifying unit 342 specifies the first conversion function among the plurality of conversion functions stored in the storage unit 250 depending on the ambient temperature and the first target object obtained respectively in steps S302 and S312 described above (S314). Then, the conversion unit 344 applies the grayscale conversion for converting temperature into luminance to the thermal image using the first conversion function (S316). In the case where the grayscale conversion is not completed for all the pixels (NO in S318), the processing returns to step S316 and the grayscale conversion is continued.

In the case where the grayscale conversion is completed for all the pixels (YES in S318), the recognition unit 346 performs the detection of the first target object (object recognition) from the first converted image obtained by the grayscale conversion in step S316 (S320). Then, the conversion function specifying unit 342 specifies the second conversion function among the plurality of conversion functions stored in the storage unit 250 according to the ambient temperature and the second target object obtained respectively in steps S302 and S312 described above (S322).

Then, the conversion unit 344 applies the grayscale conversion for converting temperature into luminance to the candidate region corresponding to the first target object detected in step S320 using the second conversion function (S324). In the case where the grayscale conversion is not completed for all the pixels (NO in S326), the processing returns to step S324 and the grayscale conversion is continued.

In the case where the grayscale conversion is completed for all the pixels (YES in S326), the recognition unit 346 performs the object recognition pertaining to the second target object from the second converted image obtained by the grayscale conversion in step S324 (S328). The display control unit 148 finally causes the display unit 160 to display the result of object recognition in step S328 (S330).

<4-3. Advantageous Effect>

The third embodiment of the present disclosure as described above detects the first target object, and then sets the region of the thermal image corresponding to the detected first target object region as the candidate region, applies the grayscale conversion to the candidate region, and performs the object recognition pertaining to the second target object on the candidate region. The converted image as a detection target of the first target object and the converted image as a detection target of the second target object are generated using the conversion function based on the data about the first target object and the conversion function based on the data about the second target object, respectively. Such a configuration makes it possible, in one example, to reduce erroneous detection, thereby improving the accuracy of object recognition.

<4-4. Modification>

Moreover, in FIG. 15 described above, the example is described in which the number of grayscales of the first converted image and the second converted image are the same (the number of bits is the same), but the present embodiment is limited to such an example. In one example, the number of grayscales of the first converted image can be smaller than the number of grayscales of the second converted image. An example in the case where the number of grayscales of the first converted image is smaller than the number of grayscales of the second converted image is described below as a modification.

Figure 17:
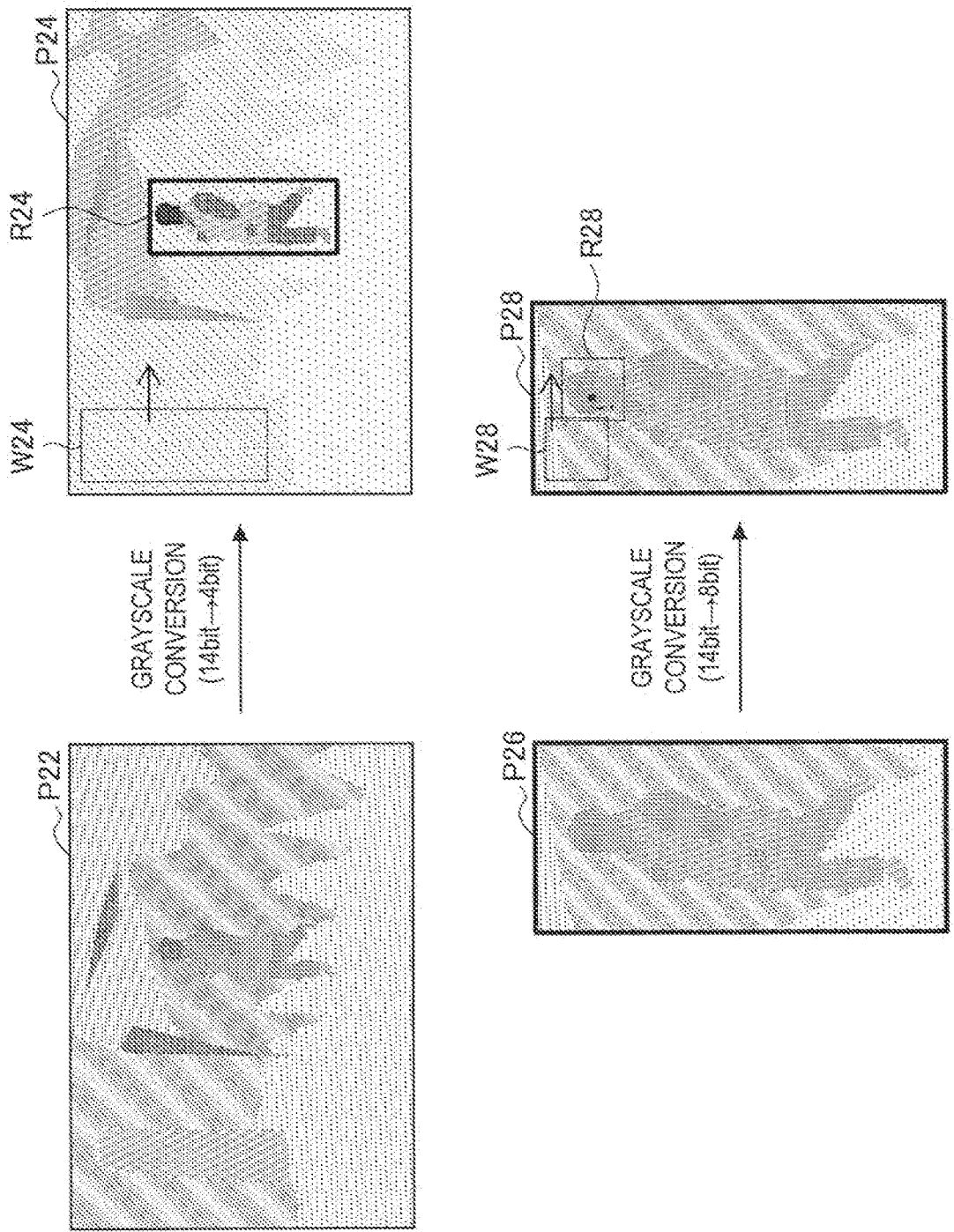
FIG. 17 is a schematic diagram illustrating a specific example of object recognition according to a modification of the present embodiment.

FIG. 17 is a schematic diagram illustrating a specific example of object recognition according to the present modification. In the following, as in the example illustrated in FIG. 15, in the example illustrated in FIG. 17, it is assumed that the object recognition is intended to detect the face.

In FIG. 15, a thermal image P22 is a thermal image in which the conversion unit 344 sets a photographic subject temperature estimated by performing grayscale conversion using a conversion function used to estimate the photographic subject temperature as the pixel value. Here, as described with reference to FIG. 15, the conversion function specifying unit 342 specifies the first conversion function based on the data about the human body (the first target object). However, the conversion function specifying unit 342 according to the present modification specifies a conversion function in which the bit number of the converted image (the first converted image) is 4 (the number of grayscales is 16) as the first conversion function.

Then, the recognition unit 346 performs the human body detection from the first converted image generated by applying the grayscale conversion to the thermal image P22 by the conversion unit 344 using the first conversion function (an image P24 illustrated in FIG. 17). Here, as shown in the image P24, the recognition unit 346 performs scanning while shifting a window W24 to detect a human body region R24.

Further, the conversion function specifying unit 342 specifies the second conversion function based on the data about the face (the second target object). The conversion function specifying unit 342 according to the present modification specifies a conversion function in which the number of bits of the converted image (the second converted image) is 8 (the number of grayscales is 256) as the second conversion function.

The conversion unit 344 applies the grayscale conversion to a candidate region P26 corresponding to the first target object in the thermal image P22 that is detected by the recognition unit 346 using the second conversion function to generate the second converted image. Then, the recognition unit 346 performs the face detection from the generated second converted image (an image P28 illustrated in FIG. 17). Here, as shown in the image P28, the recognition unit 346 performs scanning while shifting a window W28 to detect a facial region R28.

As described above, in the example illustrated in FIG. 17, the number of grayscales of the first converted image is smaller than the number of grayscales of the second converted image. Such a configuration acquires an effect that the accuracy of object recognition (face detection) on the second converted image is hardly deteriorated while reducing the data amount and the throughput in the object recognition (the human body detection) on the first converted image, as compared with the example of FIG. 15.

5. Fourth Embodiment

The first, second, and third embodiments of the present disclosure are described above. A fourth embodiment of the present disclosure is now described. An image processing apparatus according to the fourth embodiment of the present disclosure performs the grayscale conversion for estimating the photographic subject temperature but does not necessarily perform the grayscale conversion using the conversion function based on the data about the target object.

<5-1. Configuration>

Figure 18:
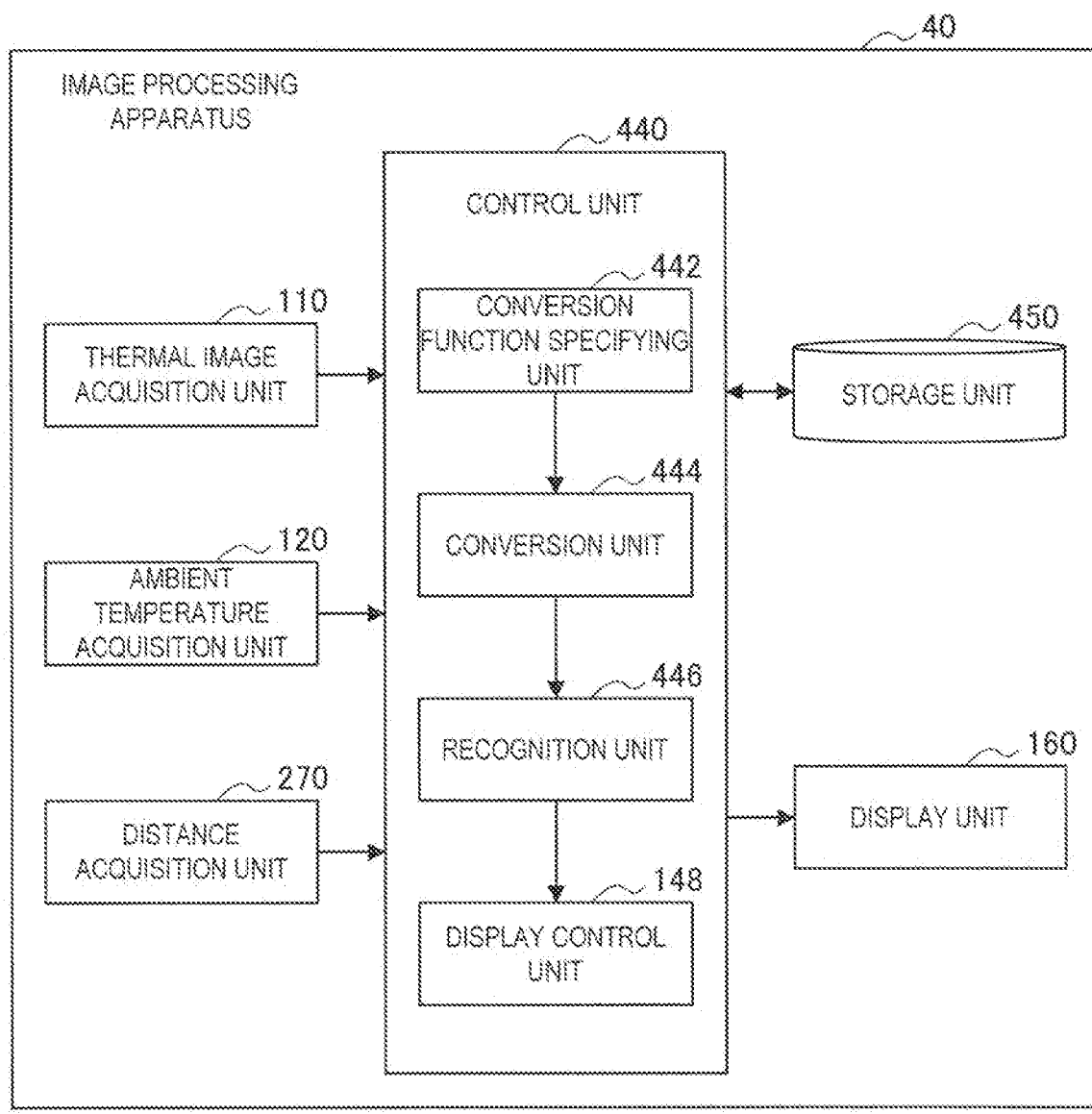
FIG. 18 is a diagram illustrated to describe a configuration example of an image processing apparatus according to a fourth embodiment of the present disclosure.

FIG. 18 is a diagram illustrated to describe a configuration example of the image processing apparatus according to the fourth embodiment of the present disclosure. As illustrated in FIG. 18, an image processing apparatus 40 according to the present embodiment differs from the image processing apparatus 20 illustrated in FIG. 10 in that the operation unit 130 is not provided and the functional configurations of a control unit 440 and a storage unit 450 are partially different from those of the control unit 240 and the storage unit 250, respectively, illustrated in FIG. 10. Moreover, the components substantially similar to the components illustrated in FIGS. 2 and 10 among the respective components illustrated in FIG. 18 are denoted by the same reference numerals, so description thereof will be omitted.

The control unit 440 illustrated in FIG. 18 controls each component of the image processing apparatus 40. In addition, the control unit 440 according to the present embodiment also functions as a conversion function specifying unit 442, a conversion unit 444, a recognition unit 446, and a display control unit 148, as illustrated in FIG. 18.

The conversion function specifying unit 442 according to the present embodiment specifies one conversion function among the plurality of conversion functions stored in the storage unit 450 and supplies the specified conversion function to the conversion unit 444. In one example, the conversion function specifying unit 442 can specify a conversion function used to estimate the photographic subject temperature depending on the ambient temperature supplied from the ambient temperature acquisition unit 120 and the distance acquired by the distance acquisition unit 270, which is similar to the conversion function specifying unit 242 according to the second embodiment. Moreover, the conversion function specifying unit 442 according to the present embodiment is different from the conversion function specifying unit 242 according to the second embodiment in that it does not have a function of specifying a conversion function used to convert temperature to luminance.

The conversion unit 444 according to the present embodiment applies the grayscale conversion to a thermal image using a conversion function specified on the basis of the distance to estimate the photographic subject temperature pertaining to the photographic subject of the thermal image, which is similar to the conversion unit 344 according to the second embodiment. In addition, the conversion unit 444 according to the present embodiment is different from the conversion unit 344 according to the second embodiment in that a thermal image in which the estimated photographic subject temperature is set as the pixel value of each pixel is supplied to the recognition unit 446.

The recognition unit 446 according to the present embodiment performs the object recognition on the thermal image in which the photographic subject temperature produced by applying the grayscale conversion by the conversion unit 444 is set as the pixel value of each pixel.

The storage unit 450 according to the present embodiment has programs and parameters stored therein that are used to cause each component of the image processing apparatus 40 to function, which is similar to the storage unit 250 according to the second embodiment. In one example, the storage unit 450 has a plurality of conversion functions stored therein that are used to estimate the photographic subject temperature from the observed temperature (to convert the observed temperature to the photographic subject temperature), which is similar to the storage unit 250. However, unlike the storage unit 250, the storage unit 450 does not necessarily store a conversion function used to convert temperature into luminance.

<5-2. Operation>

Figure 19:
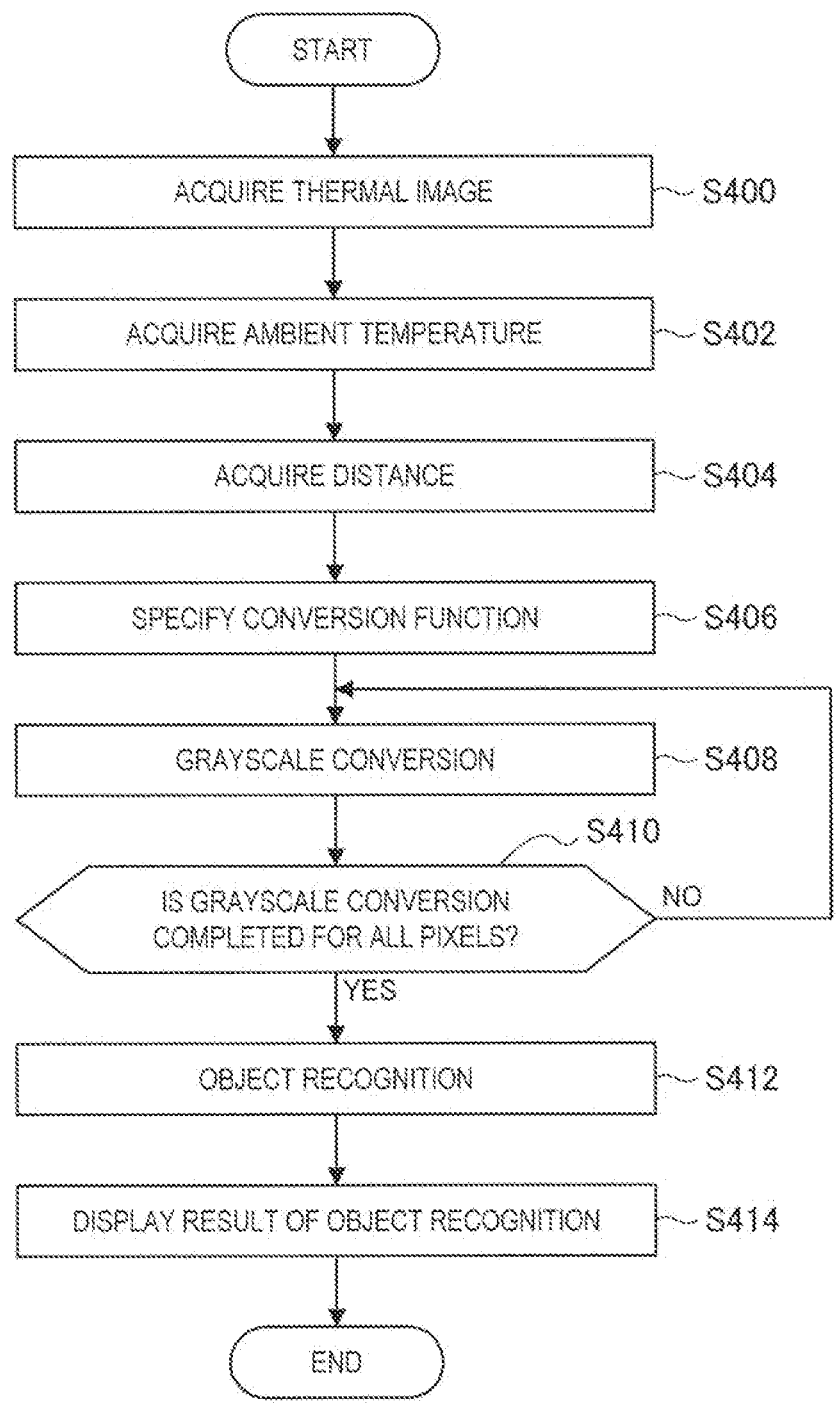
FIG. 19 is a flowchart illustrating an operation example of an image processing apparatus 40 according to the present embodiment.

The configuration of the image processing apparatus 40 according to the present embodiment is described above. The operation of the image processing apparatus 40 according to the present embodiment is now described with reference to FIG. 19. FIG. 19 is a flowchart illustrating an operation example of the image processing apparatus 40 according to the present embodiment.

The processing of steps S400 to S410 illustrated in FIG. 19 is similar to the processing of steps S200 to S210 described with reference to FIG. 13, so description thereof will be omitted.

Then, in step S412, the recognition unit 446 performs the object recognition on the thermal image in which the photographic subject temperature obtained by the grayscale conversion in step S408 is set as the pixel value of each pixel (S412). The display control unit 148 finally causes the display unit 160 to display the result of object recognition in step S412 (S414).

<5-3. Advantageous Effect>

According to the fourth embodiment of the present disclosure as described above, the photographic subject temperature pertaining to the photographic subject of the thermal image is estimated. Such a configuration makes it possible to improve the accuracy of object recognition.

6. Hardware Configuration Example

Figure 20:
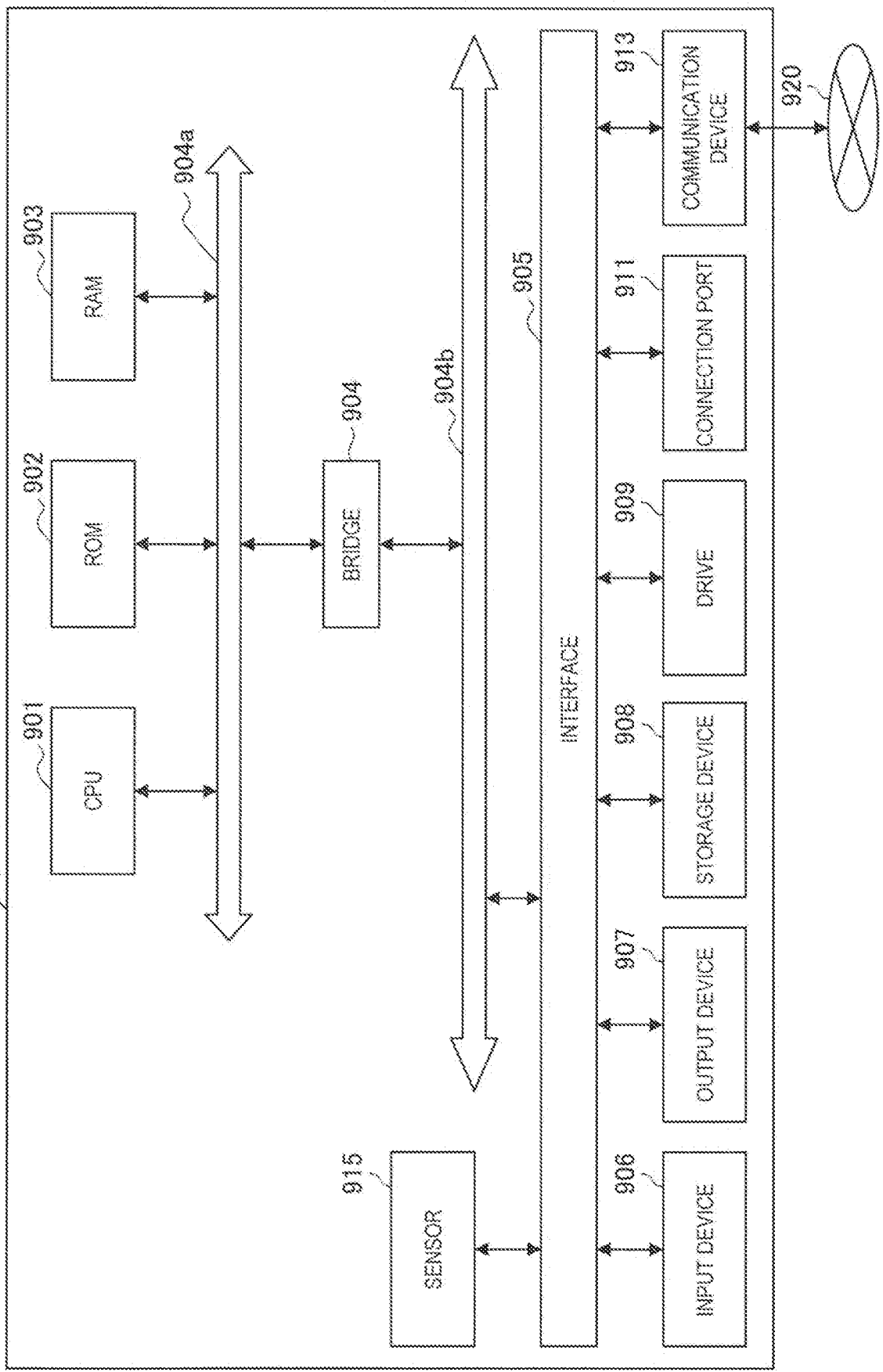
FIG. 20 is a diagram illustrated to describe a hardware configuration example.

The embodiments of the present disclosure have been described hitherto. Finally, a hardware configuration of an image processing apparatus according to the present embodiment will be described with reference to FIG. 20. FIG. 20 is a block diagram illustrating an example of the hardware configuration of the image processing apparatus according to the present embodiment. Moreover, an image processing apparatus 900 illustrated in FIG. 20 can be implemented as, in one example, the image processing apparatuses 10, 20, 30, and 40 illustrated in FIGS. 2, 10, 14, and 18, respectively. The information processing by the image processing apparatuses 10, 20, 30, and 40 according to the present embodiments is implemented by cooperation between software and hardware, which is described below.

As illustrated in FIG. 20, the image processing apparatus 900 includes a central processing unit (CPU) 901, a read only memory (ROM) 902, a random access memory (RAM) 903, and a host bus 904*a*. In addition, the image processing apparatus 900 includes a bridge 904, an external bus 904*b*, an interface 905, an input device 906, an output device 907, a storage device 908, a drive 909, a connection port 911, a communication device 913, and a sensor 915. The image processing apparatus 900 can include a processing circuit such as DSP or ASIC instead of the CPU 901 or along therewith.

The CPU 901 functions as an arithmetic processing device and a control device, and controls the overall operation in the image processing apparatus 900 in accordance with various programs. Further, the CPU 901 can be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 can be constructed as, in one example, the control units 140, 240, 340, and 440 illustrated in FIGS. 2, 10, 14, and 18, respectively.

The CPU 901, the ROM 902, and the RAM 903 are mutually connected via the host bus 904*a* including a CPU bus and the like. The host bus 904*a* is connected with the external bus 904*b* such as a peripheral component interconnect/interface (PCI) bus via the bridge 904. Further, the host bus 904*a*, the bridge 904, and the external bus 904*b* are not necessarily configured as separate components, and their functions can be equipped in a single bus.

The input device 906 is implemented as, in one example, a device to which information is input by the user, such as a mouse, a keyboard, a touch panel, a button, a microphone, a switch, and a lever. In addition, the input device 906 can be, in one example, a remote control device using infrared rays or other radio waves or can be external connection equipment, such as a cellular phone or a PDA, which supports an operation on the image processing apparatus 900. Furthermore, the input device 906 can include, in one example, an input control circuit or the like which generates an input signal on the basis of information input by the user using the aforementioned input means and outputs the input signal to the CPU 901. The user of the image processing apparatus 900 is able to operate the input device 906 to input various types of data to the image processing apparatus 900 or to instruct the image processing apparatus 900 to perform a processing operation. The input device 906 can be constructed, in one example, as the operation unit 130 illustrated in FIGS. 2, 10, and 14.

The output device 907 is constructed as a device capable of visually or audibly notifying the user of the acquired information. Examples of such a device include a display device such as CRT display devices, liquid crystal display devices, plasma display devices, EL display devices, and lamps, a sound output device such as speakers and headphones, a printer device, or the like. The output device 907 outputs, in one example, a result acquired through various types of processing performed by the image processing apparatus 900. Specifically, the display device visually displays a result acquired through various types of processing performed by the image processing apparatus 900 in various forms such as text, images, tables, and graphs. On the other hand, the sound output device converts audio signals including reproduced sound data, audio data, and the like into analog signals and audibly outputs the analog signals. The aforementioned output device 907 can be constructed, in one example, as the display unit 160 illustrated in FIGS. 2, 10, 14, and 18.

The storage device 908 is a device for data storage constructed as an example of a storage unit of the image processing apparatus 900. In one example, the storage device 908 is implemented as a magnetic storage device such as an HDD, a semiconductor storage device, an optical storage device, a magneto-optical storage device, or the like. The storage device 908 can include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 can be constructed, in one example, as the storage units 150, 250, or 450 illustrated in FIGS. 2, 10, 14, and 18.

The drive 909 is a reader/writer for a storage medium, and is built in or externally attached to the image processing apparatus 900. The drive 909 reads out information recorded on the loaded removable storage medium such as a magnetic disc, an optical disc, a magneto-optical disc, or a semiconductor memory, and outputs it to the RAM 903. In addition, the drive 909 is capable of writing information on the removable storage medium.

The connection port 911 is an interface connected with external equipment, and in one example, is a connector to the external equipment capable of transmitting data through a universal serial bus (USB) and the like.

The communication device 913 is, in one example, a communication interface constructed as a communication device or the like for connection to a network 920. The communication device 913 is, in one example, a communication card or the like for a wired or wireless local area network (LAN), long term evolution (LTE), Bluetooth (registered trademark), or wireless USB (WUSB). In addition, the communication device 913 can be a router for optical communication, a router for asymmetric digital subscriber line (ADSL), various communication modems, or the like. In one example, the communication device 913 is capable of transmitting or receiving signals to or from the Internet or other communication equipment in accordance with, in one example, a predetermined protocol such as TCP/IP.

Moreover, the network 920 is a wired or wireless channel for information transmitted from a device connected to the network 920. In one example, the network 920 can include a public circuit network such as the Internet, a telephone circuit network, or a satellite communication network, various local area networks (LANs) including Ethernet (registered trademark), a wide area network (WAN), and the like. In addition, the network 920 can include a leased line network such as an internet protocol-virtual private network (IP-VPN).

The sensor 915 corresponds to various types of sensors such as an acceleration sensor, a gyro sensor, a geomagnetic sensor, an optical sensor, a sound sensor, a distance measuring sensor, and a force sensor, in one example. The sensor 915 acquires information relating to a state of the image processing apparatus 900 itself, such as attitude and moving speed of the image processing apparatus 900, and acquires information relating to surrounding environments of the image processing apparatus 900, such as brightness and noise around the image processing apparatus 900. In addition, the sensor 915 can include a GPS sensor that receives a GPS signal and measures latitude, longitude, and altitude of the device. The sensor 915 can constructed, in one example, as the thermal image acquisition unit 110, the ambient temperature acquisition unit 120, or the distance acquisition unit 270 illustrated in FIGS. 2, 10, 14, and 18.

The exemplary hardware configuration capable of implementing the functions of the image processing apparatus 900 according to the present embodiment is illustrated above. The respective components can be implemented using a commonly used member, or can be implemented as hardware specific to the functions of the respective components. Accordingly, it is possible to change appropriately the hardware configuration to be used depending on the technical level at the time of implementing the present embodiments.

Moreover, it is possible to create a computer program for implementing each of the functions of the image processing apparatus 900 according to the present embodiment as described above and to load it into a PC or the like. Furthermore, it is possible to provide a computer-readable recording medium on which such a computer program is stored. The recording medium is a magnetic disc, an optical disc, a magneto-optical disc, a flash memory, or the like, in one example. Further, the computer program can be distributed through a network, in one example, without using a recording medium.

7. Concluding Remarks

According to the present embodiments of the present disclosure as described above, it is possible to improve the accuracy of recognition in object recognition using a thermal image.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, steps in the above-described embodiment need not be always processed in chronological order in accordance with the order described as a flow chart diagram. In one example, steps in the processes in the above-described embodiment may be processed in an order different from the order described as a flow chart diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

a conversion unit configured to apply grayscale conversion to a thermal image by using a conversion function based on data about a target object.

(2)

The image processing apparatus according to (1), in which the conversion function is produced on the basis of the data about the target object in such a way to enlarge a dynamic range in a region of the target object in a converted image generated by applying the grayscale conversion by the conversion unit.

(3)

The image processing apparatus according to (1) or (2), further including:
a detection unit configured to detect the target object from a converted image generated by applying the grayscale conversion by the conversion unit.

(4)

The image processing apparatus according to (3),
in which the detection unit detects a first target object from a first converted image obtained by applying the grayscale conversion by the conversion unit using a first conversion function based on data about the first target object, and
the conversion unit uses a second conversion function based on data about a second target object and applies the grayscale conversion to a region in the thermal image corresponding to the first target object detected by the detection unit, to generate a second converted image.

(5)

The image processing apparatus according to (4),
in which the first converted image is smaller in number of grayscales than the second converted image.

(6)

The image processing apparatus according to any one of (1) to (5), further including:
a conversion function specifying unit configured to specify one conversion function among a plurality of the conversion functions,
in which the conversion unit applies the grayscale conversion using the conversion function specified by the conversion function specifying unit.

(7)

The image processing apparatus according to (6),
in which the conversion function specifying unit specifies the conversion function depending on an ambient temperature.

(8)

The image processing apparatus according to (6) or (7),
in which the conversion function specifying unit specifies the conversion function depending on the target object selected by a user's input.

(9)

The image processing apparatus according to any one of (6) to (8),
in which the conversion function specifying unit specifies the conversion function depending on a distance.

(10)

The image processing apparatus according to (9),
in which the conversion unit estimates a photographic subject temperature pertaining to a photographic subject of the thermal image by applying the grayscale conversion using the conversion function specified depending on the distance.

(11)

The image processing apparatus according to (10),
in which the distance is a distance from a thermal image acquisition unit related to acquisition of the thermal image to the photographic subject.

(12)

The image processing apparatus according to (10),
in which the distance is a distance intended to detect the target object.

(13)

The image processing apparatus according to any one of (1) to (12), further including:
a thermal image acquisition unit configured to acquire the thermal image.

(14)

The image processing apparatus according to any one of (1) to (13),
in which the data about the target object is a temperature range of the target object, and the conversion function is a function for performing predetermined conversion in a range corresponding to the temperature range.

(15)

The image processing apparatus according to any one of (1) to (14),
in which the data about the target object is a temperature histogram pertaining to the target object, and the conversion function is a function corresponding to a cumulative density function of the temperature histogram.

(16)

An image processing method including:
applying, by a processor, grayscale conversion to a thermal image by using a conversion function based on data about a target object.

(17)

An image processing apparatus including:
a conversion unit configured to estimate a photographic subject temperature pertaining to a photographic subject of a thermal image by using a conversion function specified on the basis of a distance among a plurality of conversion functions and applying grayscale conversion to the thermal image.

REFERENCE SIGNS LIST 10 image processing apparatus
110 thermal image acquisition unit
120 ambient temperature acquisition unit
130 operation unit
140 control unit
142 conversion function specifying unit
144 conversion unit
146 recognition unit
148 display control unit
150 storage unit
160 display unit

The invention claimed is:

1. An image processing apparatus, comprising:
circuitry configured to:
apply a grayscale conversion process to a thermal image by use of a conversion function,
wherein the conversion function is based on data associated with a target object; and
generate a converted image based on the applied grayscale conversion process,
wherein the conversion function is based on the data associated with the target object such that a dynamic range in a region of the target object is enlarged in the converted image.

2. The image processing apparatus according to claim 1, wherein the circuitry is further configured to detect the target object from a lithe converted image.

3. The image processing apparatus according to claim 2, wherein the circuitry is further configured to:
detect a first target object from a first converted image, wherein
the first converted image is obtained based on the applied grayscale conversion process by use of a first conversion function, and
the first conversion function is based on data associated with the first target object;

apply the grayscale conversion process to a region in the thermal image corresponding to the first target object by use of a second conversion function,
wherein the second conversion function is based on data associated with a second target object; and
generate a second converted image based on the applied grayscale conversion process.

4. The image processing apparatus according to claim 3, wherein the first converted image is smaller in number of grayscales than the second converted image.

5. The image processing apparatus according to claim 1, wherein the circuitry is further configured to:
specify a conversion function among a plurality of the conversion functions; and
apply the grayscale conversion process by use of the specified conversion function.

6. The image processing apparatus according to claim 5, wherein the circuitry is further configured to specify the conversion function based on an ambient temperature.

7. The image processing apparatus according to claim 5, wherein the circuitry is further configured to specify the conversion function based on the target object selected by a user input.

8. The image processing apparatus according to claim 5, wherein the circuitry is further configured to specify the conversion function based on a distance.

9. The image processing apparatus according to claim 8, wherein
the circuitry is further configured to estimate a photographic subject temperature associated with a photographic subject of the thermal image based on the applied grayscale conversion process by use of the conversion function, and
the conversion function is specified based on the distance.

10. The image processing apparatus according to claim 9, wherein the distance is a distance from a thermal image acquisition unit related to acquisition of the thermal image to the photographic subject.

11. The image processing apparatus according to claim 9, wherein the distance is a distance intended to detect the target object.

12. The image processing apparatus according to claim 1, further comprising:
a thermal image acquisition unit configured to acquire the thermal image.

13. The image processing apparatus according to claim 1, wherein
the data associated with the target object is a temperature range of the target object, and
the conversion function is a function to perform a specific conversion in a range corresponding to the temperature range.

14. The image processing apparatus according to claim 1, wherein
the data associated with the target object is a temperature histogram of the target object, and
the conversion function is a function corresponding to a cumulative density function of the temperature histogram.

15. An image processing method, comprising:
applying, by a processor, a grayscale conversion process to a thermal image by use of a conversion function,
wherein the conversion function is based on data associated with a target object; and
generating, by the processor, a converted image based on the applied grayscale conversion process,
wherein the conversion function is based on the data associated with the target object such that a dynamic range in a region of the target object is enlarged in the converted image.

* * * * *